United States Patent [19]

Creswick

[11] Patent Number: 5,327,234
[45] Date of Patent: Jul. 5, 1994

[54] TIME DELAY AND INTEGRATE FOCAL PLANE ARRAY DETECTOR

[75] Inventor: Howard W. Creswick, Richardson, Tex.

[73] Assignee: Texas Instruments Incorporated, Dallas, Tex.

[21] Appl. No.: 729,659

[22] Filed: Jul. 15, 1991

[51] Int. Cl.$^5$ .............................................. H04N 7/12
[52] U.S. Cl. ...................................... 348/399; 382/27; 348/295; 348/305
[58] Field of Search .............. 358/139, 213.26, 213.11, 358/213.19; 357/24; 359/213; 382/27

[56] References Cited

U.S. PATENT DOCUMENTS

| | | | |
|---|---|---|---|
| 4,703,179 | 10/1987 | Motooka | 358/213.11 |
| 4,728,804 | 3/1988 | Norsworthy | 358/213.11 |
| 4,767,937 | 8/1988 | Norsworthy | 358/213.11 |
| 4,910,693 | 3/1990 | Sperling et al. | 382/27 |
| 5,041,912 | 8/1991 | Schlig et al. | 382/27 |
| 5,049,740 | 9/1991 | Pines et al. | 359/214 |
| 5,140,147 | 8/1982 | Barnett | 358/213.22 |

*Primary Examiner*—John K. Peng
*Attorney, Agent, or Firm*—Rene' E. Grossman; Richard L. Donaldson

[57] ABSTRACT

System and method to achieve high resolution and sensitivity from scanned focal plane array detectors without generating objectionable articfacts by scanning a scene in alternate odd and even channels at a predetermined scanning rate to provide a plurality of equally time spaced samples in each channel, offsetting the samples in the even channels relative to the odd channels to be time spaced intermediate adjacent samples of the odd channels, forming a plurality of odd TV lines, each of the odd lines composed of the samples from a different one of the odd channels and the interstices between the samples in each of the odd lines being composed of a sample which is a function of the samples abutting each of the interstices in the odd lines, forming a plurality of even TV lines, each of the even lines composed of the samples from a different one of the even channels and the interstices between the samples in each of the even lines being composed of a sample which is a function of the samples abutting each of the interstices in the even lines and generating video signals from the odd TV lines and the even TV lines in interlaced manner at a multiple of the predetermined rate.

20 Claims, 19 Drawing Sheets

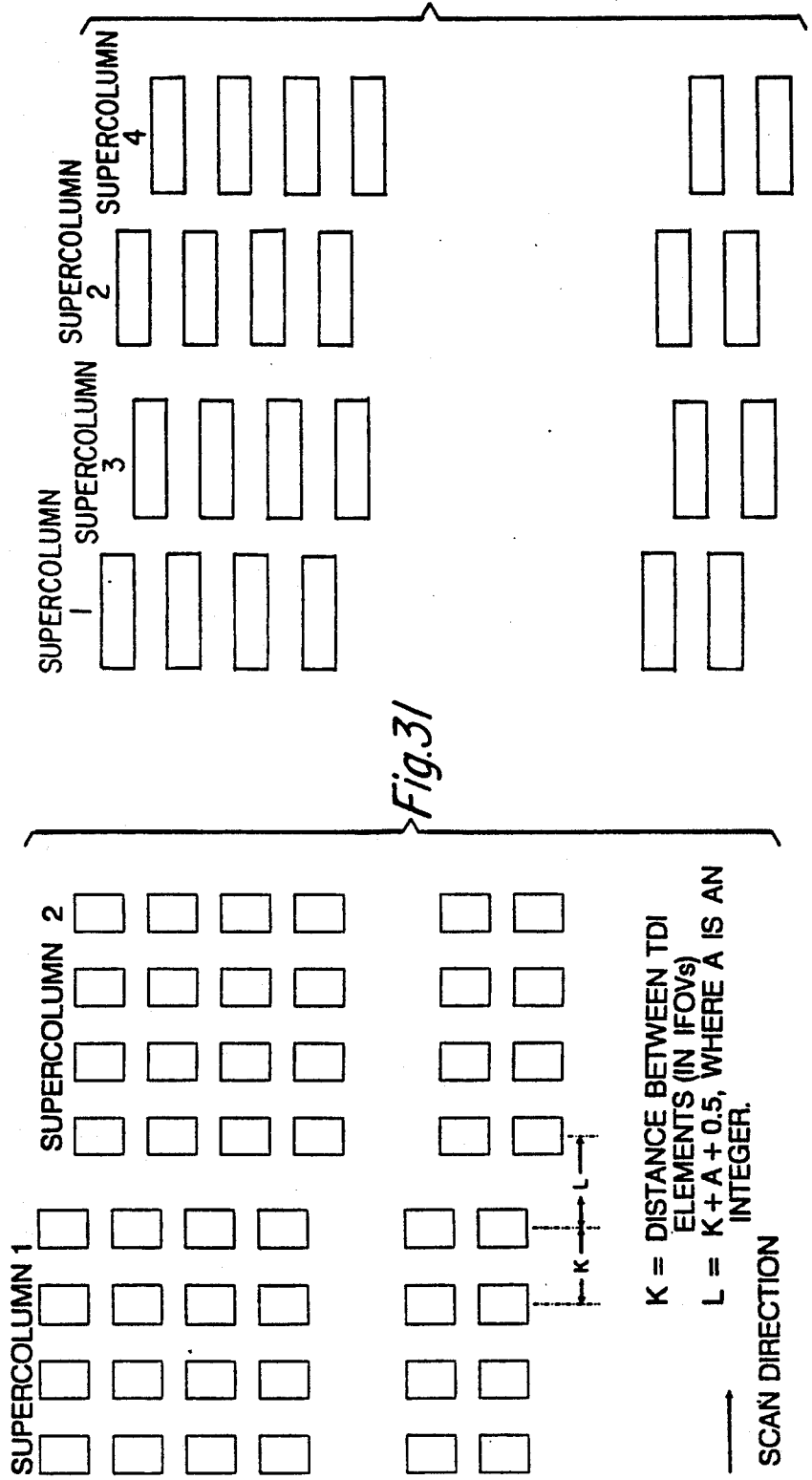

TIME DELAY AND INTEGRATE FOCAL PLANE ARRAY DETECTOR

BACKGROUND OF THE INVENTION

1. Field of the Invention

This invention relates to forward looking infrared (FLIR) and related systems and, more specifically, to systems and methods for applying interleaved sampling when using scanned time delay and integrate (TDI) focal plane array (FPA) detectors to obtain high resolution without objectionable artifacts.

2. Brief Description of the Prior Art

High sensitivity and resolution in FLIR systems using scanned non-TDI FPA detectors, while eliminating artifacts, has been achieved in the prior art as evidenced by U.S. Pat. No. 5,140,147 for "INTRAFIELD INTERLEAVED SAMPLE VIDEO PROCESSOR/REFORMATTER" of James S. Barnett, the contents of which are incorporated herein by reference. However, current TDI detector architectures do not permit both rectangular and interleaved sampling.

Non-TDI scanned FPA detectors typically contain 1 to 4 columns of detector elements as shown in FIG. 1. Typical non-TDI and TDI FPA detectors are designed to take two samples while the array is scanned across a distance equal to the instantaneous field of view (IFOV) or width of a single element. FIG. 1 shows an example of a four column non-TDI detector with an intercolumn spacing of N IFOVs. N is frequently an integer but this is not a requirement. More generally, $M=NW$ where M is an integer number of sample spaces between columns and N is not necessarily an integer. However, the principles involved are generally applicable to other configurations of FPA detectors.

Current FPA detectors are typically designed to operate at a 30 Hz scan rate to minimize signal bandwidth and to provide a rectangular sample pattern as shown in FIG. 2. Current FPA designs were primarily influenced by the perceived needs of automatic target cuers, classifiers and recognizers. Such target identifiers demand very high resolution, non-interlaced, "snapshot" images with high sensitivity. Their operation is independent of image displays and they usually operate at scan rates of 30 Hz or less.

Many applications of FPA detectors require that the FLIR system display images and automatically identify and track targets. In scenarios involving high angular rates, automatic target trackers require 60 Hz image update rates from the FPA. Standard television monitors display interlaced video at a 60 Hz field rate and 30 Hz frame rate as shown in FIGS. 3A to 3C. Display of current 30 Hz, non-interlaced FPA video on standard 60 Hz television format displays causes objectionable flicker, reduces useful resolution and introduces severe artifacts for moving scenes or for moving objects within a still scene.

FIG. 4 shows the functional components of a typical FPA FLIR system. Various configurations and implementation details are feasible. Optics 1 collect infrared energy from the scene. To simplify detector fabrication and to reduce noise sources, FLIR systems typically sample all elements simultaneously as the scanner 2 moves the image across the FPA detector 3. FPA timing electronics 4 typically derive sampling and multiplexing control signals from scene position information provided by a scan position sensor and/or from fixed frequency clocks. The FPA converts infrared energy to a sampled electrical signal. The signal from each detector element shown in FIG. 1 is amplified and sent to a multiplexer 5. The multiplexer reduces the number of outputs required from the detector. A FPA detector with 960 elements typically is multiplexed to 16 outputs. Analog-to-digital conversion and digital multiplexing 6 provide four streams of digital information, each representing one of four columns of detectors shown in FIG. 1.

Since the columns are spatially separated, the Mth sample from detector elements in column 1 is misaligned by 2N sample intervals, for a sampling density of two samples/IFOV, compared to the Mth sample from detector elements in column 2. N is the center-to-center spacing (in IFOVs) between columns. Total misalignment between columns 1 and 4 equals 6N sample times at two samples/IFOV. Column alignment circuits 7 delay the samples from each of the four columns by the proper time (number of samples) to align them spatially for display. N equals 4 for a typical non-TDI detector. Table 1 shows the number of sample delays required to align detector columns for three values of N.

TABLE 1

| REQUIRED SAMPLE DELAYS TO ALIGN NON-TDI DETECTOR COLUMNS FOR RECTANGULAR SAMPLE PATTERNS AT TWO SAMPLES PER IFOV | | | | |
|---|---|---|---|---|
| N | Column 1 Delay | Column 2 Delay | Column 3 Delay | Column 4 Delay |
| 5 | 30 | 20 | 10 | 0 |
| 4 | 24 | 16 | 8 | 0 |
| 3 | 18 | 12 | 6 | 0 |

These circuits, shown in FIG. 5, typically use first-in, first-out (FIFO) memories. They delay column 1 (elements 1, 5, 9, etc.) by 6N samples, column 2 by 4N samples and column 3 by 2N samples with respect to samples from column 4 when the FPA shown in FIG. 1 is scanned from left to right. This produces the rectangular sampling pattern shown in FIG. 2. If the image is scanned from right to left, these circuits delay column 4 by 6N, column 3 by 4N and column 2 by 2N samples with respect to column 1. The same function also could be embedded into the addressing scheme for the reformatter function 9 shown in FIG. 4.

Image processor circuits 8 perform various functions to enhance image quality for display and for automatic target trackers and identifiers. Reformatter circuits 9 store the sampled FPA data in memory in FPA detector output format (4 vertical columns), then read it out in the single line interlaced television format shown in FIGS. 3A to 3C. FIG. 6 is a block diagram of a reformatter that uses two-port video random access memories (VRAMs) as the FPA sampled data storage medium. Pixel selector logic 14 controls a 4:1 multiplexer function 13, which constructs a TV format video stream from the VRAM 12 outputs. If the FPA were scanned from top to bottom rather than horizontally across the scene, reformatter memory storage requirements would be reduced since FPA output data would be in horizontal format.

Video generator circuits 10 convert digital FLIR data to standard analog composite television video signals. FIG. 7 is a block diagram of a typical video generator circuit. A high speed digital-to-analog (D/A) converter 15 converts the digital output from the reformatter into an analog signal. The low pass filter circuit 16 removes signal content at frequencies greater than one-half the sample frequency. It also provides the desired frequency domain transfer function. FIG. 8 shows a typical low pass filter response. Video buffer circuits 17 add standard vertical and horizontal synchronization signals and provide proper voltage levels and impedances to the monitor.

Simply doubling the FPA scan rate would eliminate moving image flicker and artifacts from the display and would benefit automatic target trackers. However, 30 Hz FPA data rates can be as high as 960 million bits/second for 12 bit data words. Doubling scan rate would double data rates, thereby significantly increasing the cost, power and size of FLIR system electronics and making most such systems economically unfeasible under present technology. Doubling the scan rate also would reduce FPA detector sensitivity by the square root of two. If the number of samples were reduced by a factor of two, while the scan rate were doubled, total data rate and sensitivity would remain essentially constant. However, horizontal resolution would be reduced by a factor of two.

Modifying the FPA multiplexer by adding a mode where only half the channels are output during each 60 Hz field maintains displayed resolution but reduces effective sensitivity. Interlaced multiplexing reduces sensitivity because only half the available detector elements are used and because each detector element has one-half the time to integrate infrared energy that it would have at 30 Hz.

The above identified U.S. Pat. No. 5,140,147 identifies an interleaved sampling algorithm and implementation that overcomes these problems for non-TDI FPA detectors where N in FIG. 1 is an integer. This innovative approach takes advantage of the fact that non-TDI detectors nominally designed to operate at two samples/IFOV can be sampled at certain frequencies other than 2.0 samples per IFOV. The following equation shows the allowed spatial sample frequencies for such a non-TDI FPA:

Spatial Sample Frequency = $[(2*N)-K]*2/(2*N*I)$ where:
SSF = Spatial Sample Frequency and is measured in samples/IFOV
I = 1 for Rectangular Sampling
I = 2 for Interleaved Sampling
K = any integer for Rectangular Sampling
K = odd integers for Interleaved Sampling Displayed sample frequency (DSF) is the apparent sample frequency displayed on a standard monitor as a result of the FPA sampling and reformatting algorithms. The following equations show the relationship between SSF and DSF:

DSF = I × SSF
DSF = SSF for I = 1 (Rectangular Sampling)
DSF = 2 * SSF for I = 2 (Interleaved Sampling)

If "I" equals one, any integer value of "K" will result in the rectangular spatial sampling pattern shown in FIG. 2. There is an equal integer number of samples between each detector column. Table 2 shows several possible values of SSF for rectangular sampling in addition to the normal value of 2.00. However, rectangular sampling patterns are not formed if "K" is an odd integer and I = 2.

TABLE 2

PERMITTED SPATIAL SAMPLING FREQUENCIES FOR NON-TDI DETECTORS THAT FORM A RECTANGULAR SAMPLING PATTERN.

| Value of K | Value of I | Samples/IFOV | Displayed Samples/IFOV |
|---|---|---|---|
| −1 | 1 | 2.25 | 2.25 |
| 0 | 1 | 2.00 | 2.00 |
| 1 | 1 | 1.75 | 1.75 |
| 2 | 1 | 1.50 | 1.50 |
| 3 | 1 | 1.25 | 1.25 |
| 4 | 1 | 1.00 | 1.00 |
| 5 | 1 | 0.75 | 0.75 |

Table 3 lists the SSF for several values of K, for N = 4. SSF is about one half the nominal value of 2.00 for K = −1 or for K = 1, while DSF is approximately 2.00. These SSFs can therefore be achieved at a 60 Hz scan rate with little impact on detector sensitivity, FLIR resolution or FLIR video processor electronics size, weight or power.

TABLE 2

PERMITTED SPATIAL SAMPLING FREQUENCIES FOR NON-TDI DETECTORS THAT FORM A INTERLEAVED SAMPLING PATTERN.

| Value of K | Value of I | Samples/IFOV | Displayed Samples/IFOV |
|---|---|---|---|
| −3 | 2 | 1.375 | 2.75 |
| −1 | 2 | 1.125 | 2.25 |
| 1 | 2 | 0.875 | 1.75 |
| 3 | 2 | 0.625 | 1.25 |

FIG. 9 shows an overlay of the sampling pattern with respect to the non-TDI array for K = 1 and I = 2. There is an equal integer number of samples between every other column. Samples between adjacent columns have a half-IFOV spatial offset. If the external column alignment circuits are programmed to delay column 1 video by 10 sample times, column 2 by 7 sample times and column 3 by 3 sample times, columns 1 and 3 will be aligned with each other but offset by one-half IFOV from columns 2 and 4. FIG. 10 shows the resulting pattern.

Table 4 shows the sample delays that must be programmed into the column alignment circuit illustrated in FIG. 5 to obtain the offset sampling pattern shown in FIG. 10 for several values of K and N.

TABLE 4

REQUIRED SAMPLE DELAYS TO ALIGN NON-TDI DETECTOR COLUMNS FOR INTERLEAVED SAMPLE PATTERNS.

| N | K | Column 1 Delay | Column 2 Delay | Column 3 Delay | Column 4 Delay |
|---|---|---|---|---|---|
| 4 | −3 | 16 | 11 | 5 | 0 |
| 4 | −1 | 13 | 9 | 4 | 0 |
| 4 | 1 | 10 | 7 | 3 | 0 |
| 3 | −1 | 10 | 7 | 3 | 0 |
| 4 | 3 | 7 | 5 | 2 | 0 |

The reformatter shown in FIG. 6 is normally programmed to construct each TV line from a sequence of M samples from a single detector element. The reformatter forms a TV frame of L horizontal TV lines, each line containing M samples, by reading M samples from L/2 detectors at a 60 Hz rate as shown in FIGS. 3A to 3C. To display FLIR images in interleaved format, the reformatter reads approximately M/2 samples from L detectors each TV field. FIGS. 11, 12 and 13 illustrate the required algorithm.

Line 1 of TV field A is constructed by reading the first sample from detector 1, then the second sample from detector 2, then the third sample from detector 1, etc. The second line (TV line 3) 2 of TV field A is formed using samples from detectors 3 and 4. The first line of field B (TV line 2) is formed by detectors 2 and 3, the second line (TV line 4) from detectors 4 and 5, etc. This provides the effective vertical interlace between TV fields A and B shown in FIGS. 3A to 3C and 13.

Since every other TV format sample is displayed at a vertical offset of one-half IFOV from its true position, interleaved sampling creates an artifact. The displayed image of a horizontal edge will have serrations along the edge one sample wide and one sample deep. Vertical edges are not affected. This artifact is independent of motion and is easily removed by a one-dimensional low pass filter with a notch at one-half the sample frequency. FIG. 8 shows an example of such a filter.

FIG. 14 shows the architecture of a typical TDI detector. Four "super columns" each containing 4 TDI subelements (A, B, C and D), replace the four columns of detector elements in FIG. 1. FIG. 14 shows twenty channels out of a typical 480 or 960. FIG. 15 illustrates internal TDI function. Delay circuits 19, 20 and 21 time-delay analog domain samples from each of the four TDI subelements within a single FPA channel. Next, the summer 22 adds (integrates) samples from the four subelements into a single output value. It then sends the integrated sample to the FPA output multiplexer. TDI of four subelements improves FPA signal-to-noise ratio by a factor of up to 2:1 compared to the non-TDI detector shown in FIG. 1. The TDI function can be implemented using charge coupled devices (CCD), delay lines or charge steering approaches.

The four "OR" functions 18 in FIG. 15 allow two-way scan operation. When the array shown in FIG. 14 is scanned left-to-right, the "OR" functions steer subelements A to the 6N sample delay function. Subelement D has zero sample delay. When the array is scanned right-to-left, subelement D is delayed 6N sample periods and subelement a has zero delay. "OR" circuits also select the proper delay element for subelements B and C, depending upon the scan direction.

Current TDI detectors are typically fabricated with equal element spacings of 1.5 to 2.5 IFOVs between all subelements, including those at the boundary between super-columns. Table 5 shows the total delay required, in numbers of samples at two samples per IFOV, to align each subelement within a single detector channel for various interelement spacings.

TABLE 5

| TOTAL SUBELEMENT DELAY REQUIRED (TWO SAMPLES/IFOV) | | | | | |
|---|---|---|---|---|---|
| Spacing: | N | A | B | C | D |
| 1.5 IFOV's | 1.5 | 9 | 6 | 3 | 0 |
| 2.0 IFOV's | 2.0 | 12 | 8 | 4 | 0 |

TABLE 5-continued

| TOTAL SUBELEMENT DELAY REQUIRED (TWO SAMPLES/IFOV) | | | | | |
|---|---|---|---|---|---|
| Spacing: | N | A | B | C | D |
| 2.5 IFOV's | 2.5 | 15 | 10 | 5 | 0 |
| 3.0 IFOV's | 3.0 | 18 | 12 | 6 | 0 |
| 4.0 IFOV's | 4.0 | 24 | 16 | 8 | 0 |

External column alignment circuits shown in FIG. 5 align TDI FPA detector super-columns. TDI detectors typically require greater total delay than non-TDI FPAs. Detector geometry and TDI circuit implementation (FIG. 15) have limited TDI detectors to a single sample frequency, typically two samples per detector IFOV. This prohibits the use of interleaved sampling techniques to eliminate motion artifacts. Doubling the scan rate would generally result in a prohibitive cost, size and power increase for the FLIR video processor electronics shown in FIG. 4.

SUMMARY OF THE INVENTION

In accordance with the present invention, the system and method of the prior art, primarily as embodied in the above mentioned U.S. Pat. No. 5,140,147 and discussed hereinabove, are improved to include the important "time delay and integrate" (TDI) class of scanned FPA detectors. The present invention defines changes to current TDI detector physical layout, TDI circuit implementation and generalizes the reformatting algorithm. This invention results in a TDI detector capable of both interleaved sampling at a 60 Hz field rate and rectangular sampling patterns at 30 Hz or lower field rates. Therefore, a common detector can serve automatic target identifier, target tracker and display interfaces. In addition, detector operation can be changed between 30 Hz and 60 Hz modes in response to changing priorities. For example, when the head track of an operator aims the FLIR, the system will switch to 60 Hz interleaved sampling. When the FLIR is automatically panned across the scene in an attempt to identify targets, the system will switch to a 30 Hz mode.

An alternate approach identified as channel averaging is also provided.

BRIEF DESCRIPTION OF THE DRAWINGS

FIGS. 3A-3C are diagrams of standard prior art interlaced 60 Hz television format;

FIG. 31 shows a two column FPA capable of interleaved sampling; and

FIG. 32 shows a TDI array with supercolumns 2 and 3 reversed.

DESCRIPTION OF THE PREFERRED EMBODIMENT

The following discussion describes a design for a TDI detector capable of both interleaved and rectangular sample patterns. The discussion assumes a four column array desired rectangular sample pattern density of two samples per subelement IFOV, although the concept can be extended to other detector geometries and sample densities.

Figure 14:
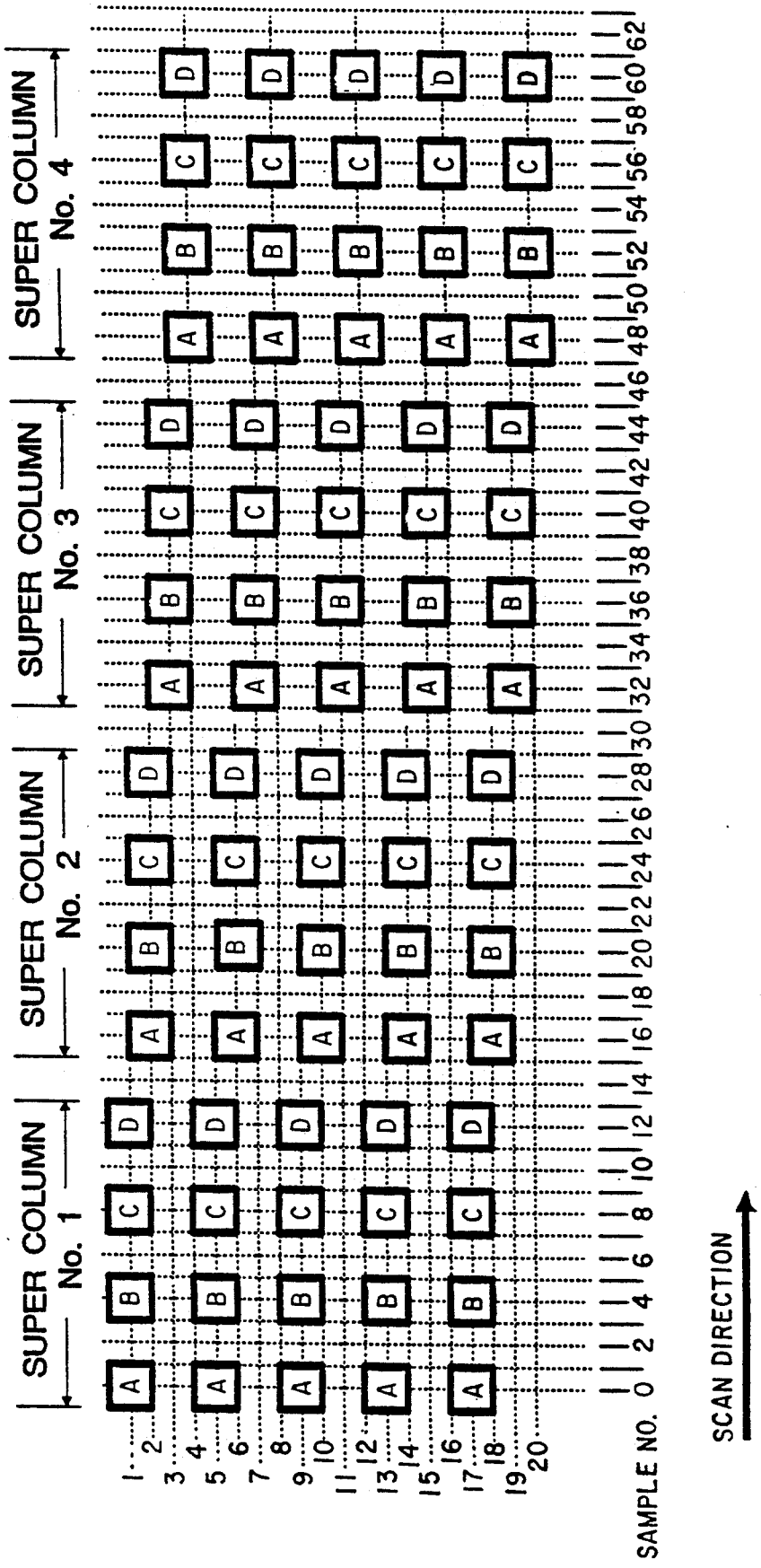
FIG. 14 is a diagram showing the physical layout of a TDI detector and a spatial sampling pattern of two samples per IFOV in accordance with the prior art.
Figure 16:
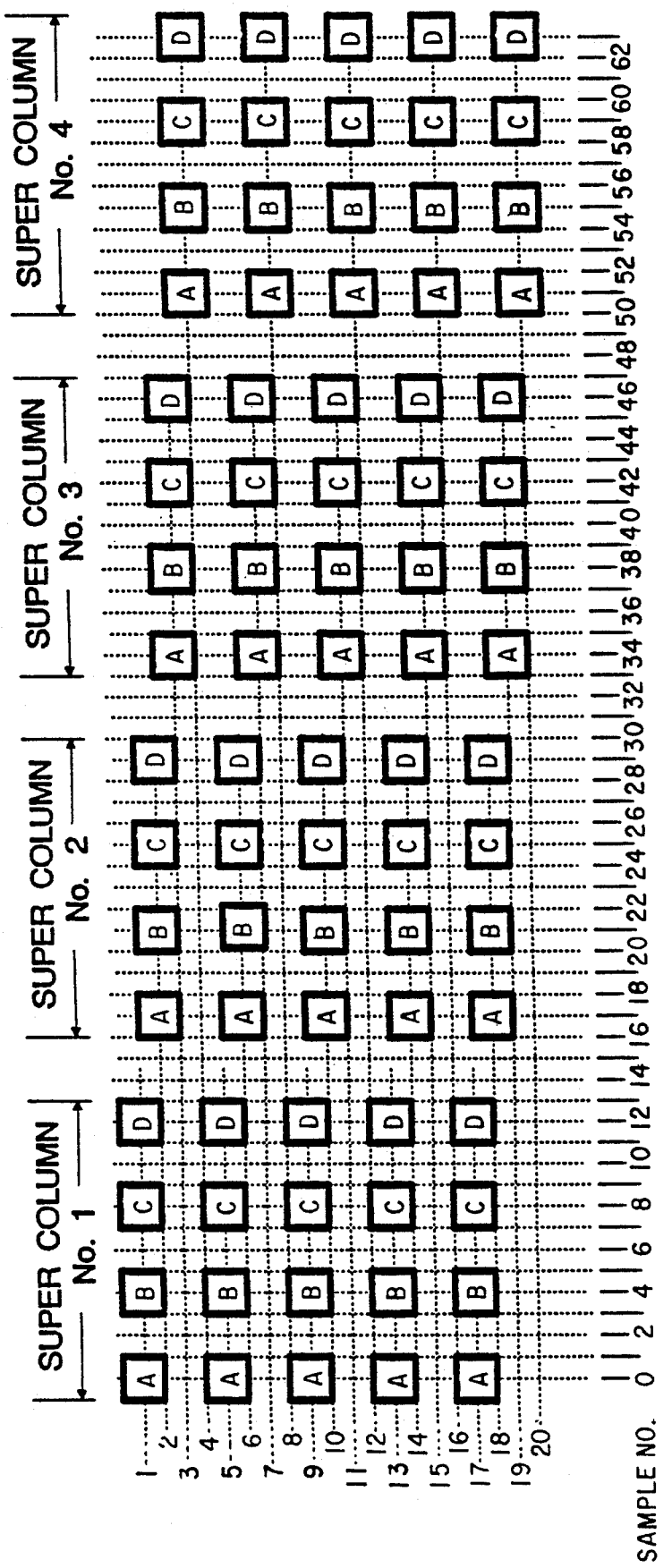
FIG. 16 is a diagram showing the physical layout of a TDI detector and a spatial sampling pattern of two samples per IFOV in accordance with the present invention.

First, the center-to-center spacing between FPA detector TDI subelements must be an even (2, 4, etc.) integer multiple of the subelement IFOV. In FIGS. 14 and 16 the subelement spacing equals 2.0 IFOVs, which is within the state of the art. Spacings of 4 IFOVs or more are feasible but less desirable because they increase size and cost of the column alignment function and reduce system scan efficiency.

Figure 17:
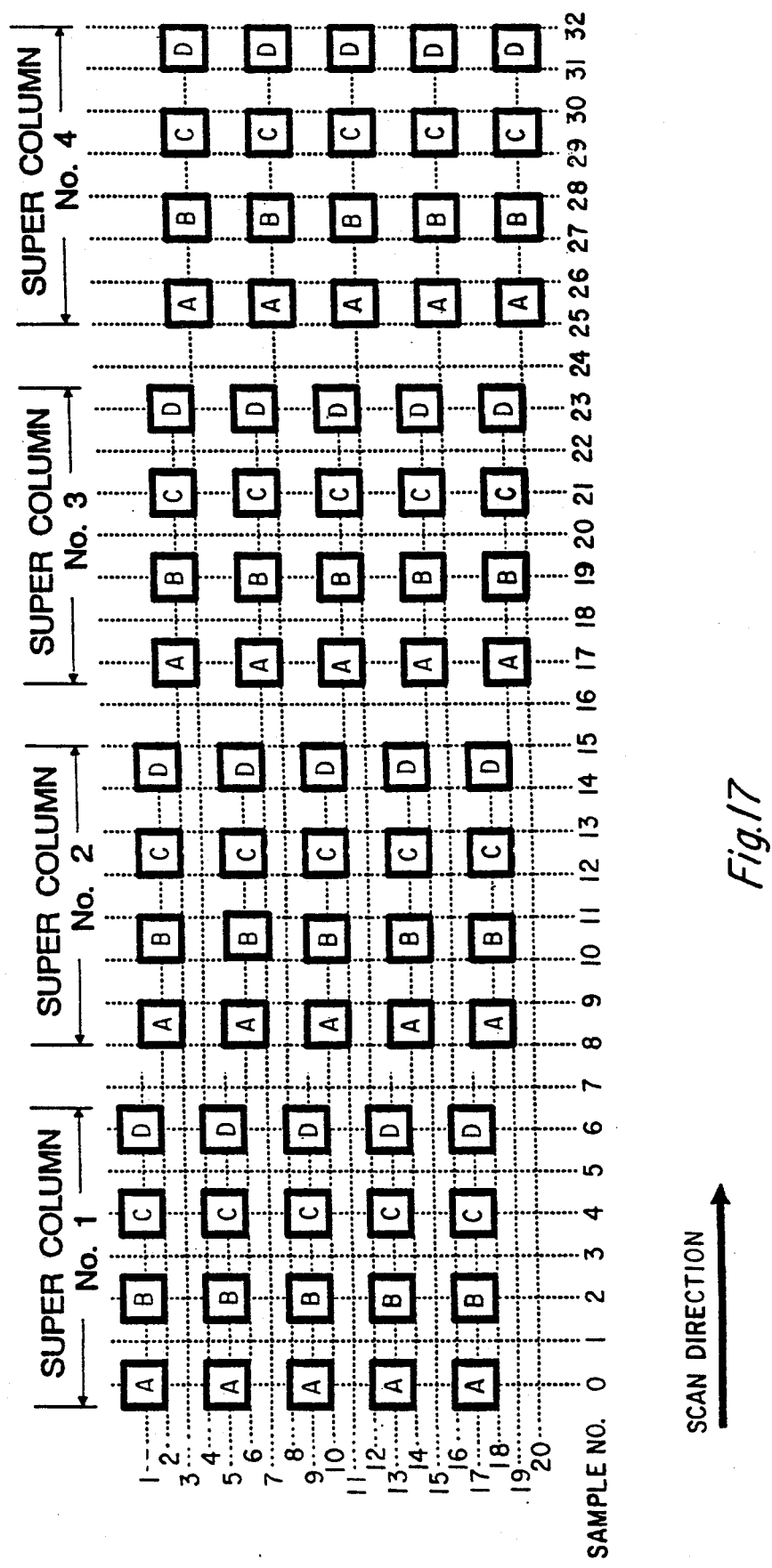
FIG. 17 is a diagram showing the physical layout of a TDI detector and a spatial sampling pattern of one sample per IFOV in accordance with the present invention.

Second, spacing between super-columns must be an odd integer (1, 3, etc.) multiple of the TDI subelement IFOV divided by two. FIGS. 16 and 17 show a spacing of 2.5 IFOVs, although spaces of 3.5 or more IFOVs are permissible if required to simplify FPA design.

Figure 15:
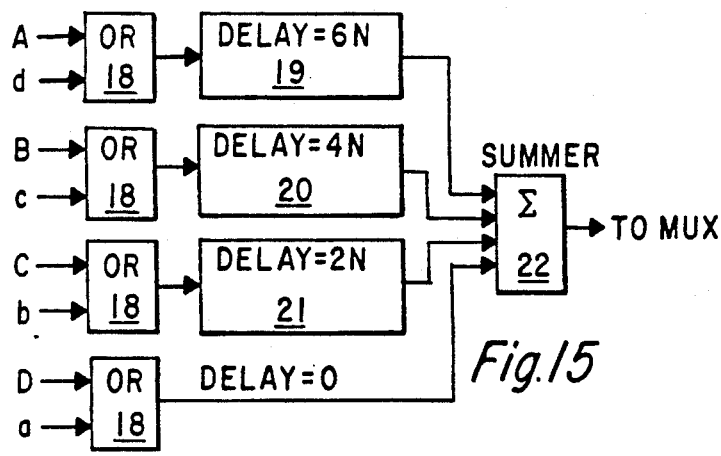
FIG. 15 is a functional block diagram of the FPA time delay and integrate (TDI) operation in accordance with the prior art.
Figure 8:
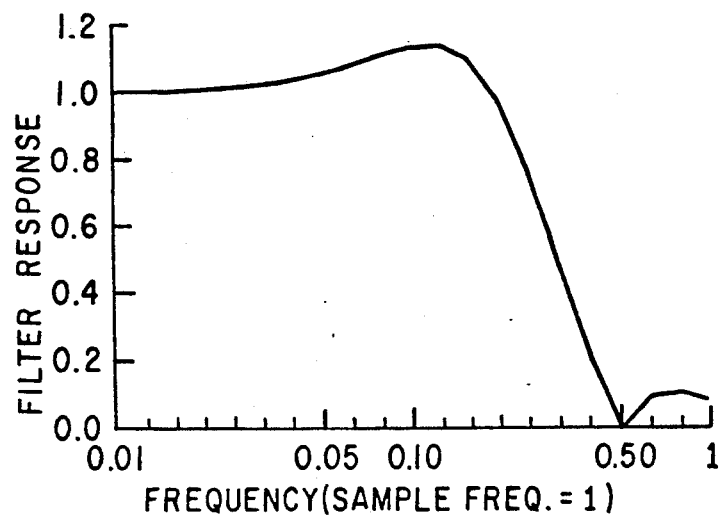
FIG. 8 is a graph of a typical frequency response for the low pass filter circuit of FIG. 7.
Figure 9:
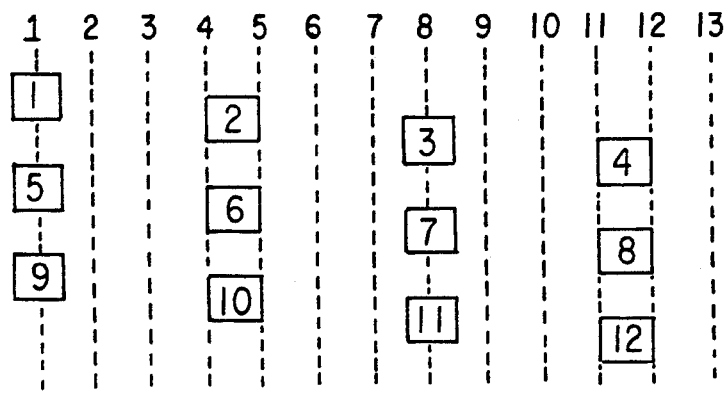
FIG. 9 is a diagram of a revised offset spatial sampling pattern compared to the physical locations of detector elements within a non-TDI focal plane array.
Figure 18:
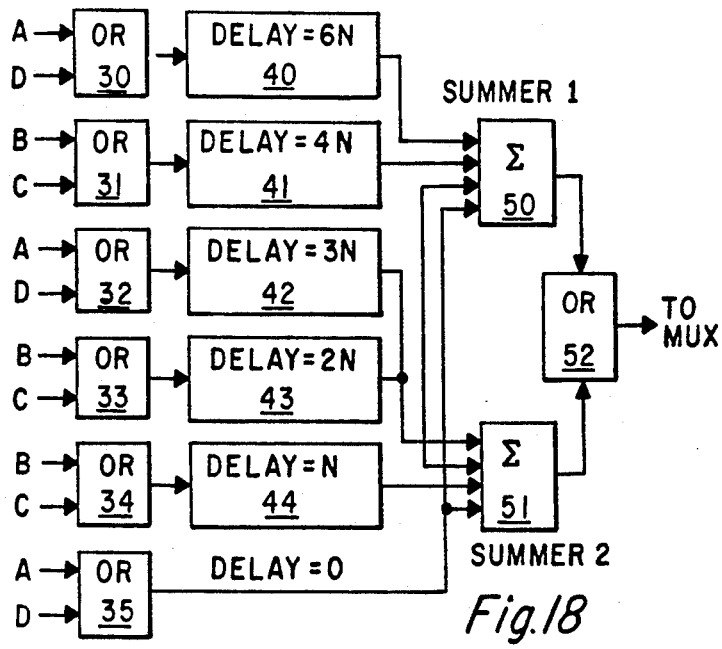
FIG. 18 is a functional block diagram of a TDI detector capable of both rectangular or interleaved sampling in accordance with the present invention.
Figure 19:
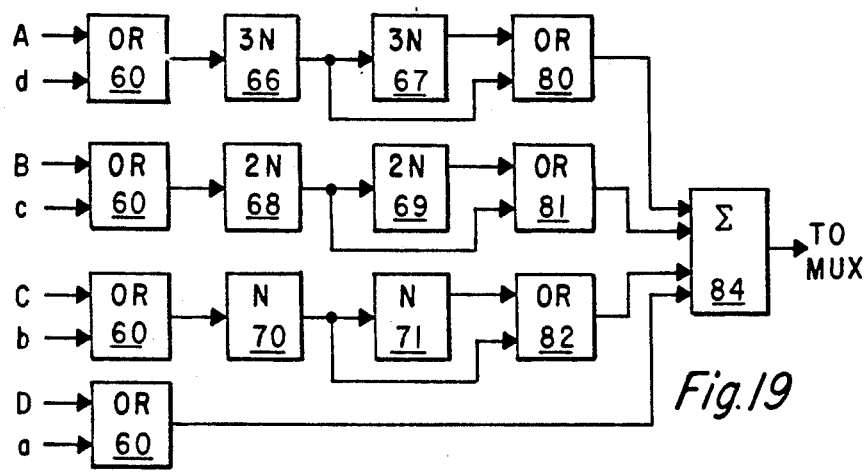
FIG. 19 is a functional block diagram of an alternative implementation of a TDI detector capable of both rectangular and interleaved sampling in accordance with the present invention.

Third, the TDI implementation shown in FIG. 15 must be modified as shown in FIGS. 18 and 19 to permit changing the internal delay applied to subelements before summation (integration). FIGS. 18 and 19 illustrate two ways of performing the same function. FIG. 19 substitutes three "OR" functions 80, 81 and 82 for the second summer 51 and output "OR" function 52 shown in FIG. 18. Both implementations permit delay selection 6N, 4N and 2N samples for rectangular sampling or 3N, 2N and N samples for interleaved sampling. Selection of the appropriate method depends upon FPA processor device technology and architecture.

Figures 1, 2:
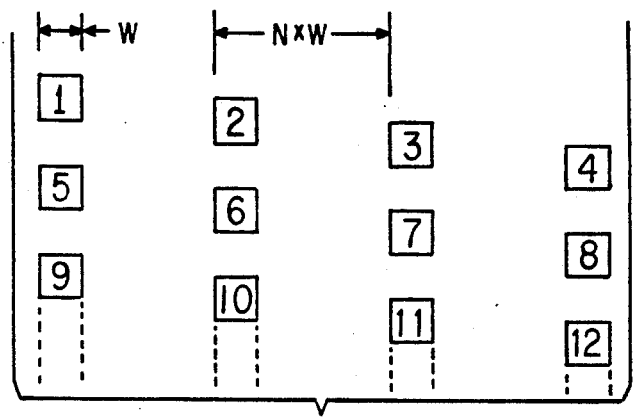
FIG. 1 is a diagram of the physical layout of a section of a non-TDI focal plane array detector in accordance with the prior art.
FIG. 2 is a diagram of the prior art rectangular sample pattern used for both TDI and non-TDI focal plane array detectors.
Figures 4, 5:
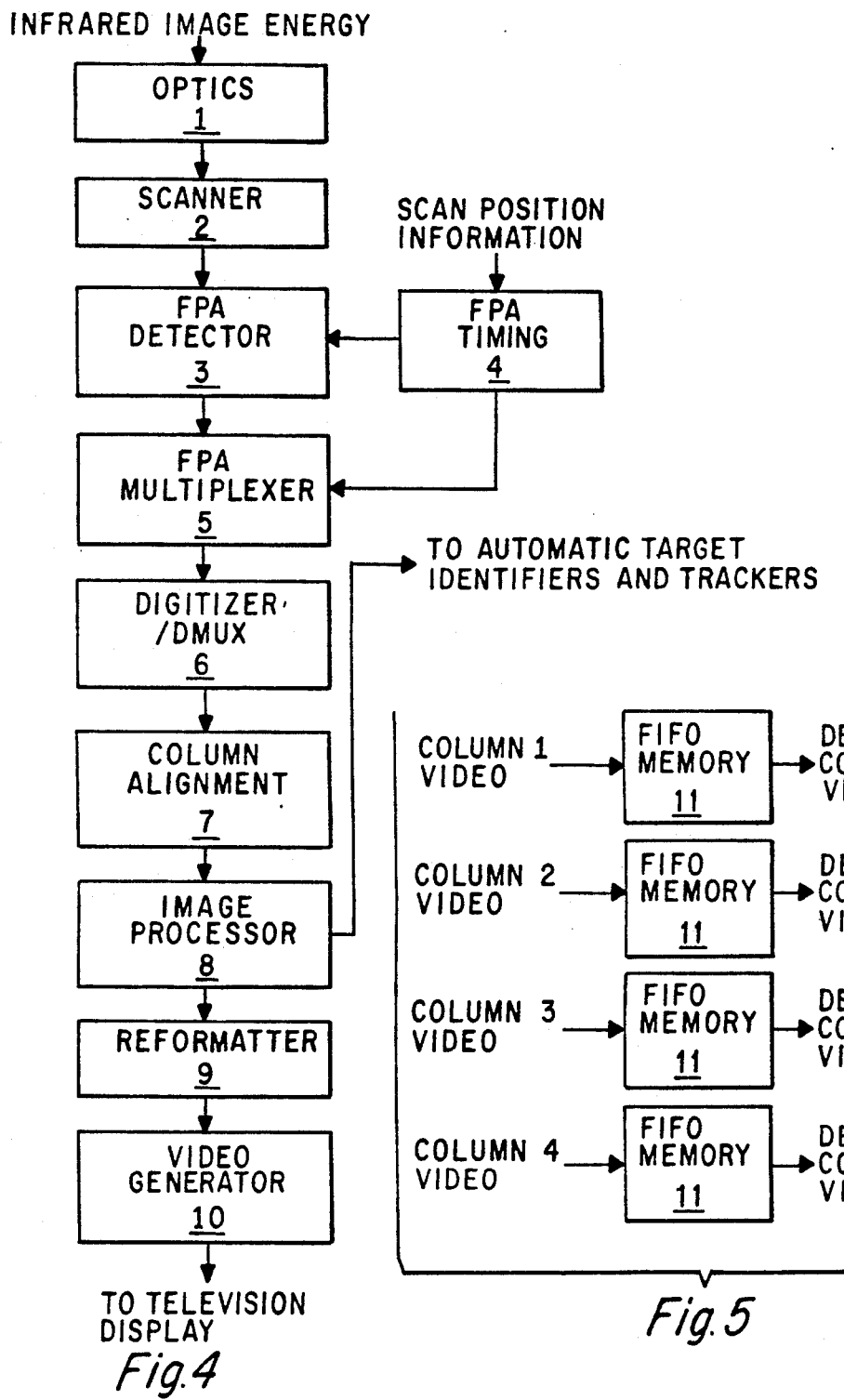
FIG. 4 is a block diagram of a typical FPA forward looking infrared (FLIR) video processing system in accordance with the prior art.
FIG. 5 is a block diagram of a prior art focal plane array column alignment circuit of FIG. 4.

Fourth, the scanner shown in FIG. 4 must be capable of both 30 Hz and 60 Hz operation. Since modern FLIR systems use microprocessor technology within scanner control loops, this flexibility is provided by modifying software.

Figure 11:
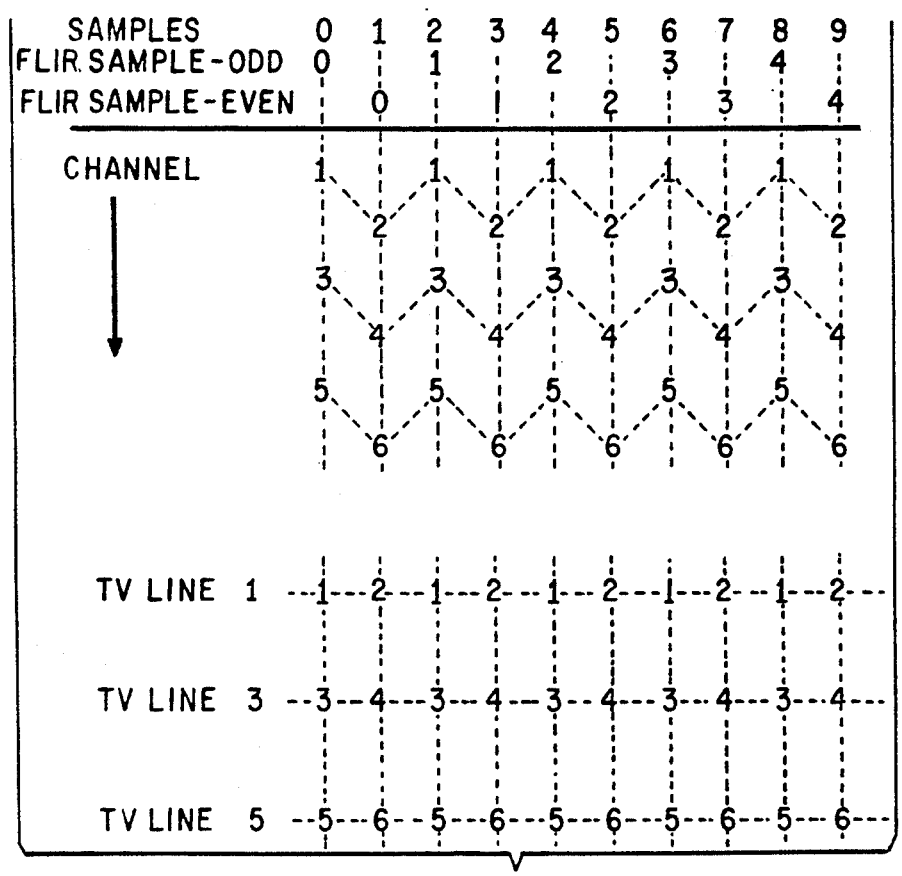
FIG. 11 is a diagram showing the method used to create TV field A output lines.
Figure 12:
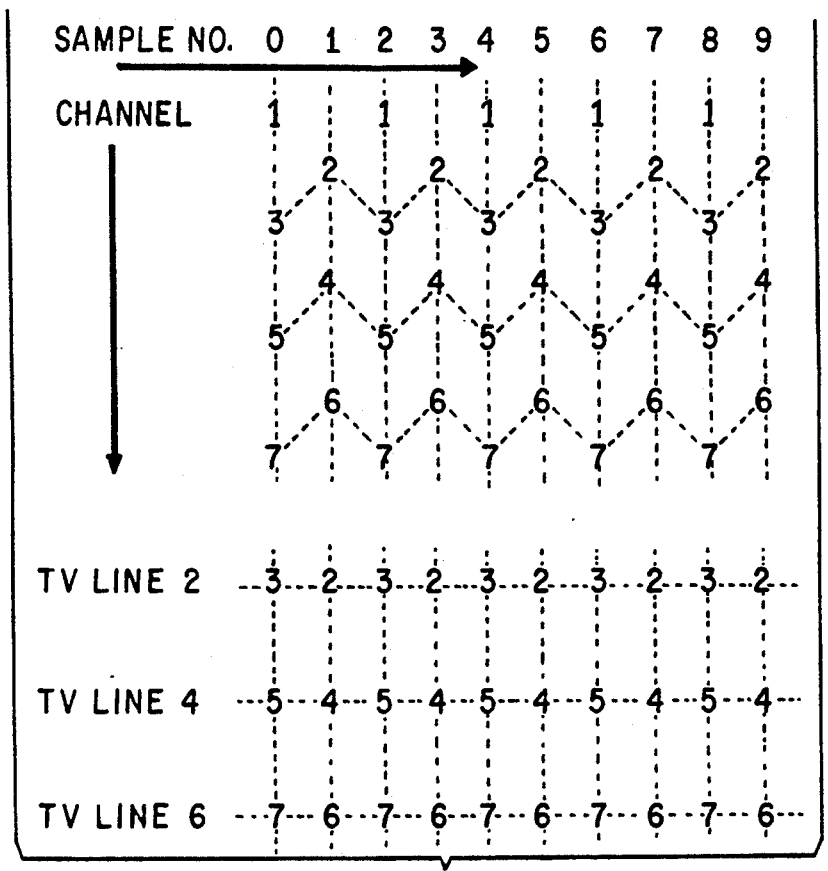
FIG. 12 is a diagram showing the method used to create TV field B output lines.
Figure 13:
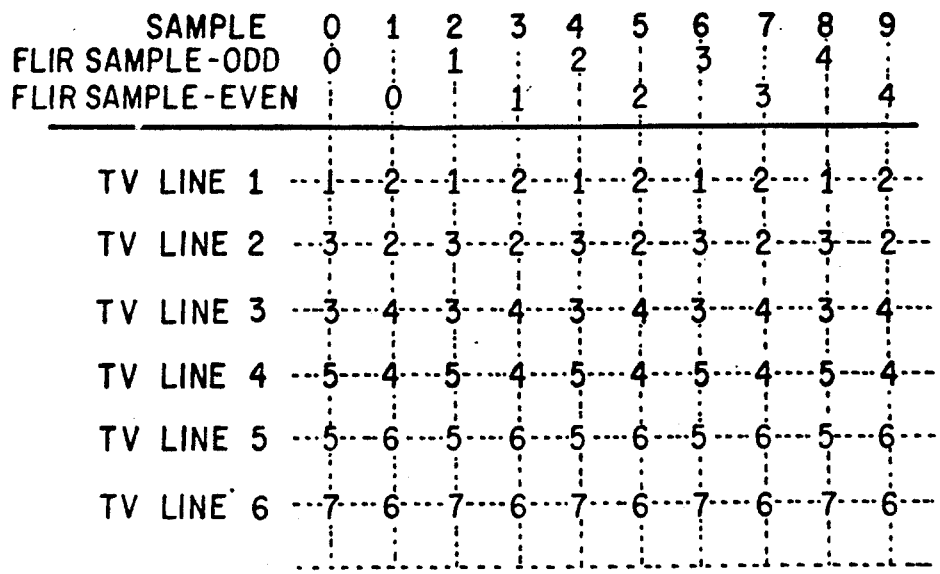
FIG. 13 is a diagram showing the composite television frame output created by interleaved sampling and reformatting.

Fifth, the reformatting algorithm described by FIGS. 11, 12 and 13 is generalized.

The FPA detector and FLIR system described above can be operated in both a 30 Hz rectangular sample pattern mode and a 60 Hz interleaved sampling mode.

In the rectangular sample pattern at 30 Hz, when the detector shown in FIG. 16 is sampled at two samples per IFOV, the input "OR" circuits 30 in FIG. 18 route TDI subelement samples through the delay lines 40, 41 and 43 associated with summer 1 (50). This part of FIG. 18 is identical with the function shown in FIG. 15. For a subelement spacing of N=2.0 IFOVs, samples from subelements A, B and C of each detector channel receive delays of 12 (6N), 8 and 4 sample periods respectively to align them with samples from subelement D. Summer 1 integrates the delayed samples from subelements A, B, C and D to provide a single TDI output sample for each detector channel. The final "OR" function 52 routes the summer 1 output to the FPA output multiplexer. The integrated output from the four subelements within a super-column is as if it were from a single detector located at subelement "D" when the scan direction is as shown in FIG. 16. Super-column outputs are received as if they were from a single element located at subelement "A" for the opposite scan direction.

FPA multiplexer and following video processor functions are identical to those used with non-TDI FPAs.

External column alignment circuits must be programmed to provide the delays between super-column outputs listed in Table 6.

TABLE 6
EXTERNAL COLUMN ALIGNMENT DELAYS (NUMBER OF SAMPLE TIMES) REQUIRED TO ALIGN TDI SUPER-COLUMNS

| MODE | SUBELEMENT SPACING, N IFOV's | SUPER-COL SPACING, S IFOV's | DELAY S-C 1 | DELAY S-C 2 | DELAY S-C 3 | DELAY S-C 4 |
|---|---|---|---|---|---|---|
| 30 Hz, Rect | 2.0 | 2.5 | 51 | 34 | 17 | 0 |
| 60 Hz, Intl | 2.0 | 2.5 | 25 | 17 | 8 | 0 |
| 30 Hz, Rect | 1.5 | 1.5 | 36 | 24 | 12 | 0 |
| 30 Hz, Rect | 2.0 | 2.0 | 48 | 32 | 16 | 0 |
| 30 Hz, Rect | 2.5 | 2.5 | 60 | 40 | 20 | 0 |

Table 6 shows required super-column delays for both rectangular and interleaved sample patterns for the new detector architecture defined above. It also shows alignment delay requirements for three conventional detector configurations that are capable of rectangular sampling only. The following equations identify the number of sample delays required to align TDI super-columns for 30 Hz rectangular sampling:

Delay, Super-Column $4 = 0$

Delay, Super-Column $3 = 2\,(3N+S)$

Delay, Super-Column $2 = 2\,(6N+2S)$

Delay, Super-Column $1 = 2\,(9N+3S)$ where:
N = Subelement spacing in IFOVs
S = Super-Column spacing in IFOVs
Spatial sample rate = 2 samples/IFOV To permit interleaved sampling at twice the field rate feasible for rectangular sampling, the spatial sample rate must be reduced from two to one sample/IFOV, as shown in FIG. 17. Since only half the number of samples are taken between subelement centers, half the number of sample delays are required within the TDI function. Table 7 shows the sample delays required to align TDI subelements for FPAs with subelement spacings of 2.0 and 4.0 IFOVs.

The "OR" functions 32, 33, 34 and 35 and the delay functions 42, 43 and 44 associated with summer 2 (51) in FIG. 18 provide the required delays to align subelements within a single channel (and super-column). The final "OR" circuit 52 routes the output from summer 2 to the FPA multiplexer and external circuits.

TABLE 7
TOTAL SUBELEMENT DELAY REQUIRED FOR TIME DELAY AND INTEGRATE (ONE SAMPLE/IFOV)

| Spacing: | N | A | B | C | D |
|---|---|---|---|---|---|
| 2.0 IFOV's | 2.0 | 6 | 4 | 2 | 0 |
| 4.0 IFOV's | 4.0 | 12 | 8 | 4 | 0 |

Super-columns are then aligned for interleaved sampling, using the programmable circuits shown in FIG. 5. As shown in Table 6, the external column alignment function must delay super-column 3 by 8 sample clock cycles to offset super-column 3 one-half detector width from super-column 4. The external column alignment function must delay super-column 2 by 17 sample periods to align super-column 2 with super-column 4. Super-column 1 must be delayed 25 sample periods for alignment thereof with super-column 3 and to offset super-column 1 one-half subelement IFOV from super-column 4. This results in a sample pattern identical with that shown in FIG. 3. The following equations identify the delays required to align TDI detector super-columns for 60 Hz interleaved sampling:

Delay, Super-Column $4 = 0$

Delay, Super-Column $3 = 3N + S - 0.5$

Delay, Super-Column $2 = 6N + 2S$

Figure 10:
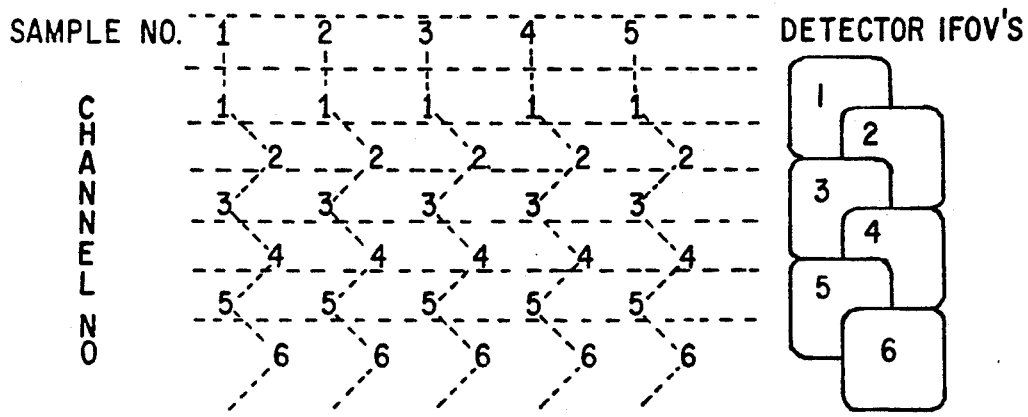
FIG. 10 is a diagram of the FPA detector offset sampling pattern used to create interleaved video.
Figure 20A:
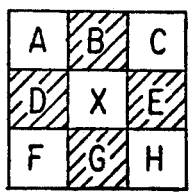
FIGS. 20A-20C are diagrams of the vertical shift and more generalized reformatting algorithms used to create television format video from the offset sampling pattern of FIG. 10 and FIG. 21.
Figure 20B:
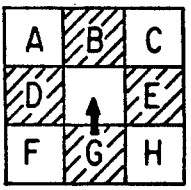
Figure 20C:
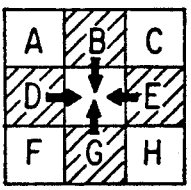

Delay, Super Column $1 = 9N + 3S - 0.5$ where
N = Subelement spacing in IFOVs
S = Super-Column spacing in IFOVs
Spatial sample rate = 2 samples/IFOV FIGS. 20A to 20C represents a small (3×3) area in sample space for a 60 Hz FPA sampled as shown in FIG. 10. However, the following concepts are extendable to larger local areas. Shaded boxes B, D, E and G represent actual samples taken by the FPA. Clear boxes X, A, C, F and H represent "missing" samples that would be taken if the FPA were operated at 30 Hz. The reformatter described in the above noted U.S. Pat. No. 5,140,147 replaces missing sample X by samples G or B. This provides excellent performance when combined with a postfilter to remove the resulting artifact. Additional performance or different properties can be obtained by creating a value for sample X based upon various functions of the local area of sample space surrounding it. For example:

$X = G$ [vertical shift algorithm]

Figure 21:
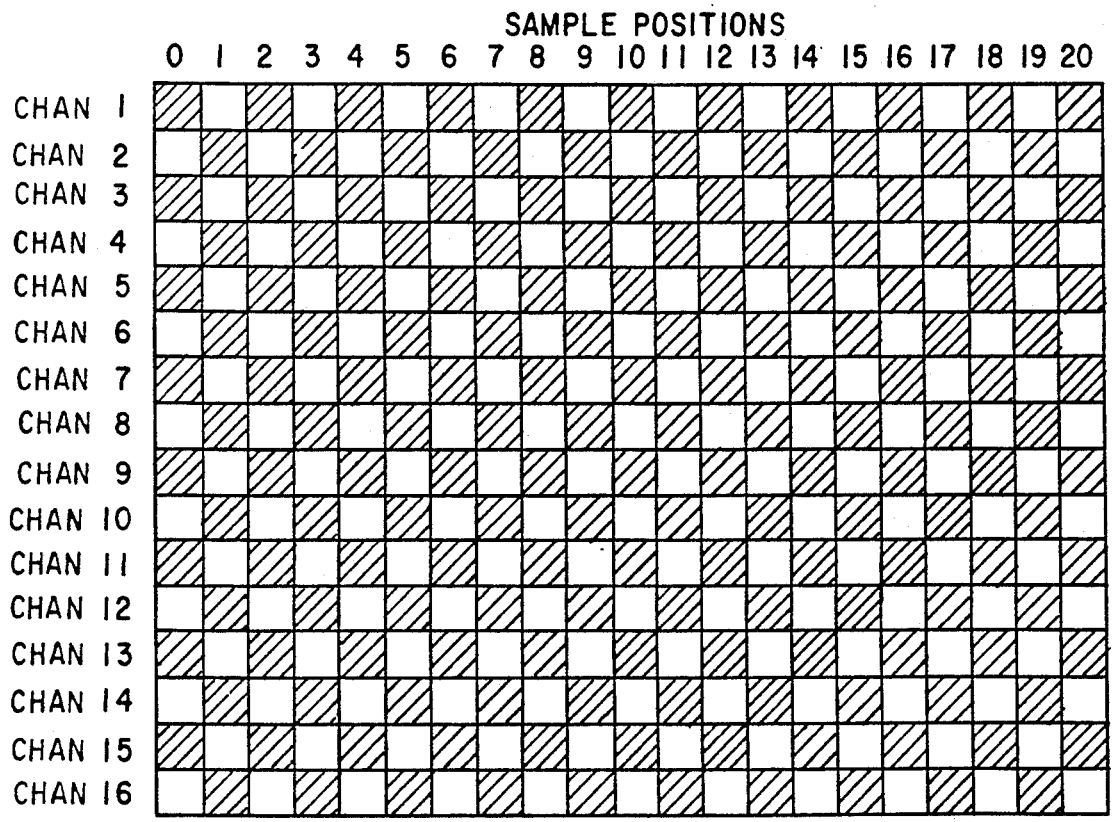
FIG. 21 is a diagram comparing the offset sampling pattern of FIG. 10 to the size of a FPA detector element.

$X =$ Median $(B, D, G)$ $X =$ Average $(B, G)$ $X =$ Function of $(B, D, E, G)$ FIG. 21 represents an interleaved sampling grid. Shaded boxes correspond to the centers of FPA detector elements with dimensions twice that of the shaded boxes.

Figure 22:
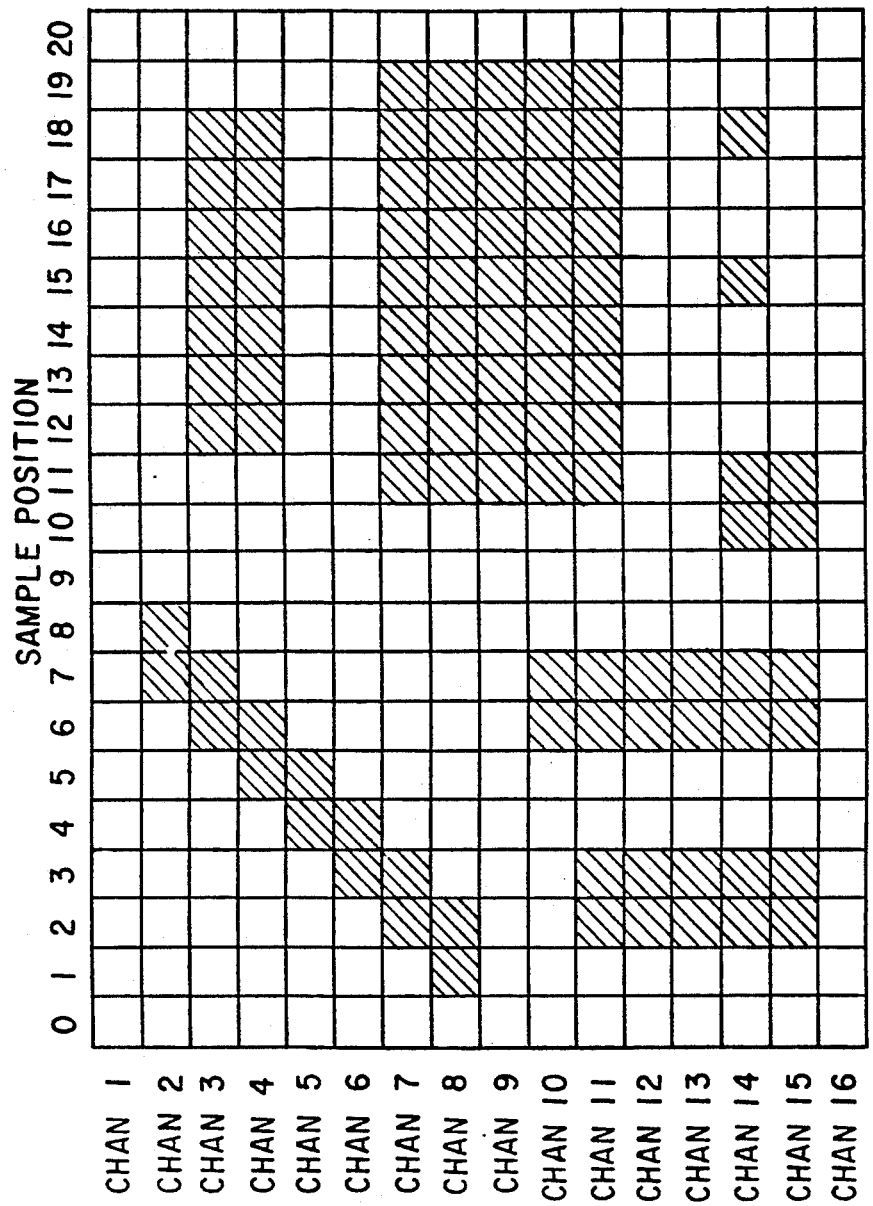
FIG. 22 is a diagram of an example scene superimposed on the sampling grid of FIG. 21.

FIG. 22 is an example of an input "scene" overlaid on the sampling grid of FIG. 21. Because the device dimensions are twice those of the sample boxes, bars two samples wide, spaced two samples apart represent the limiting resolution of the detector.

Figure 23:
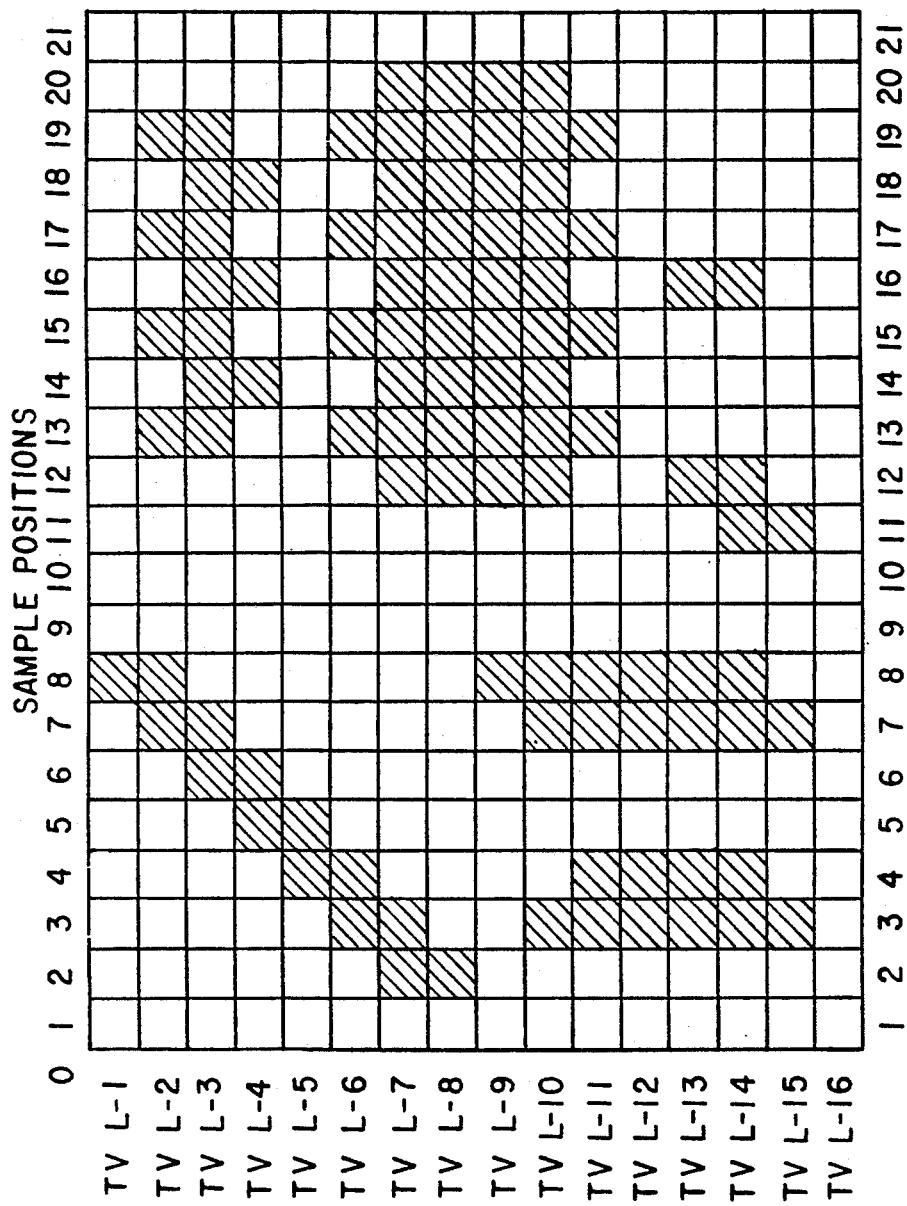
FIG. 23 is a diagram showing the output from the reformatter of FIG. 6 resulting from the vertical shift algorithm in accordance with the prior art.

FIG. 23 shows the result of the vertical shift algorithm (FIGS. 13 and 20A to 20C) at the reformatter (FIG. 6) output. A low pass filter following the reformatter reduces the intensity of the one-sample serrations on horizontal edges.

Figure 24:
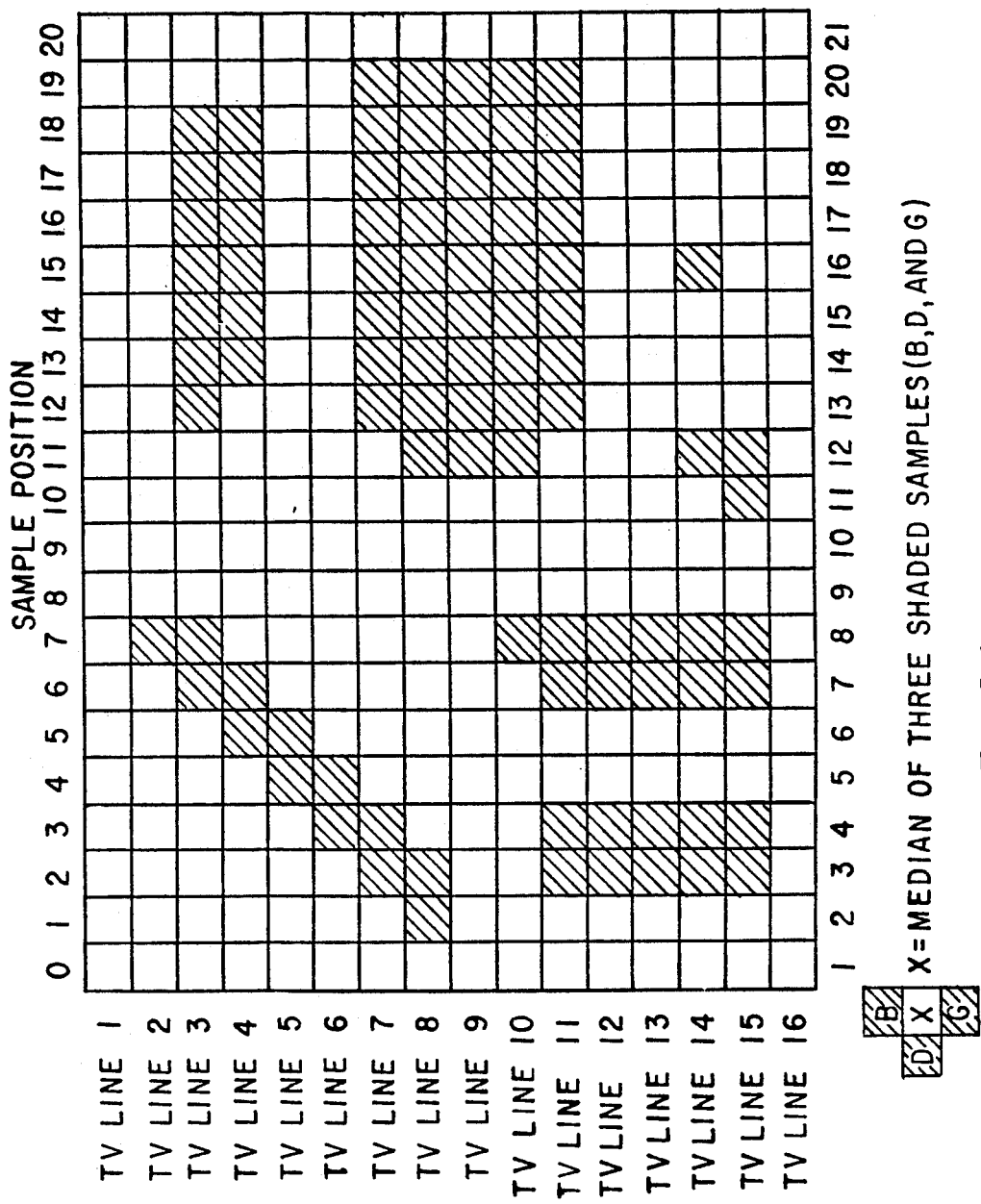
FIG. 24 is a diagram showing the output from the reformatter of FIG. 25 resulting from a three sample median algorithm in accordance with the present invention.

FIG. 24 shows the result of a three sample median substitution algorithm. This algorithm provides a better representation of the input scene but increases the complexity of the reformatter function.

Figure 6:
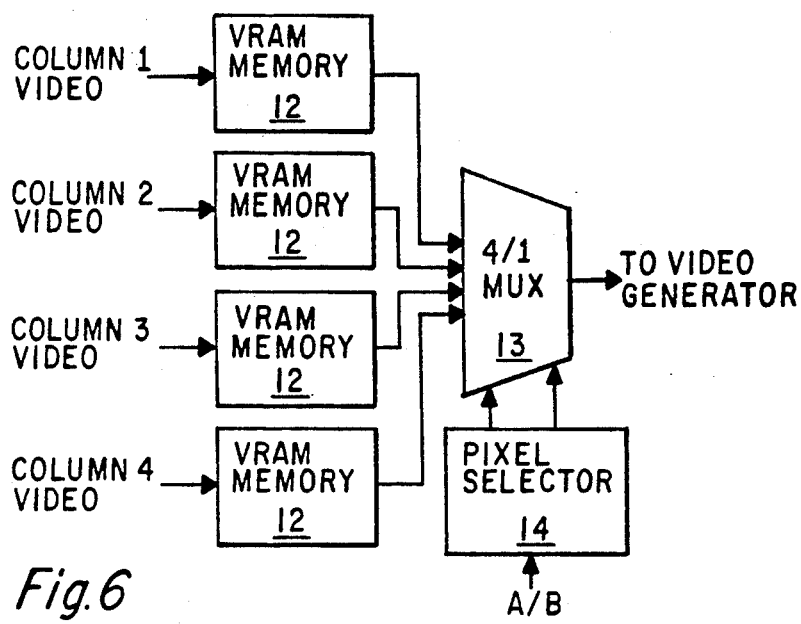
FIG. 6 is a block diagram of the reformatter circuit of FIG. 4 in accordance with the prior art.
Figure 7:
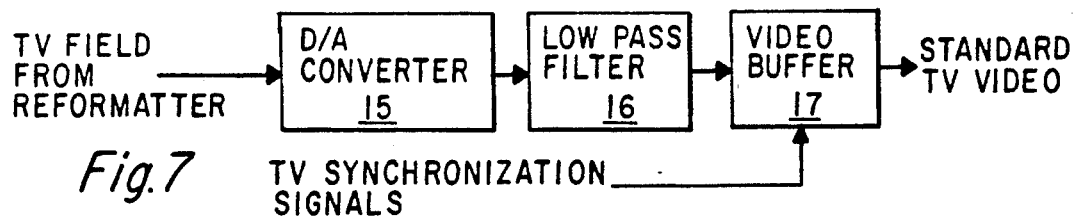
FIG. 7 is a block diagram of the video generator circuit of FIG. 4.
Figure 25:
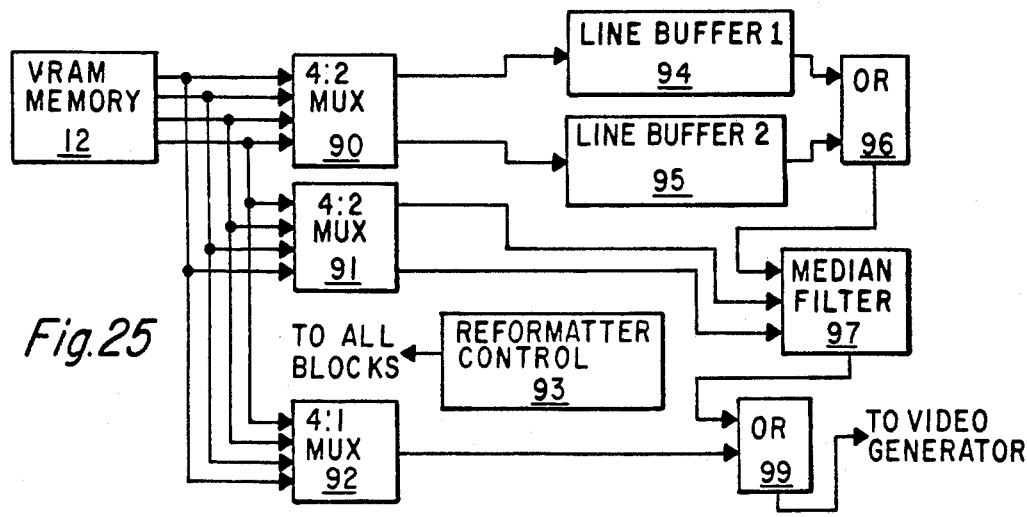
FIG. 25 is a block diagram of a revised reformatter in accordance with the present invention which can perform the three sample median, vertical shift, rectangular and other reformatting logarithms.

FIG. 25 shows the additional functions required to provide capability to execute the three sample median, vertical shift and 30 Hz rectangular algorithms VRAM memory 12 represents the four VRAM memory blocks shown in FIG. 6. The 4:1 multiplexer 92 incorporates a transport delay equalization latch not required by similar circuit 13 in FIG. 6. Reformatter control 93 is a more complex version of the pixel selector circuit 14 shown in FIG. 6. To provide 30 Hz rectangular or 60 Hz interleaved (vertical shift algorithm) operation, the reformatter control circuit routes VRAM memory data through the 4:1 multiplexer and through OR circuit 99. The reformatter shown in FIG. 6 is designed to simultaneously read four adjacent samples from a single FLIR detector channel from memory during 30 Hz FPA operation. During 60 Hz interleaved FPA operation, the same reformatter structure reads two adjacent samples from two adjacent FLIR detector channels. Both cases require the same memory output data rate.

The three sample median algorithm requires the same information from two adjacent channels as the vertical shift interleave algorithm. The median algorithm also requires simultaneous information from a third detector channel. Line buffers 94 and 95 provide a cost effective alternative to increasing all VRAM memory (typically 2×960×1280 bytes) speed by 3:2.

Each of the line buffers 94 and 95 stores samples (typically only 640 bytes) from a single detector channel. First-In First-Out (FIFO) memories are ideal for this function. The first line of TV field B is TV line 2 in FIG. 24. TV line 2 is constructed by interleaving true samples from FPA channel two with created samples. Each created sample is the median of true samples from FPA channels 1 and 3 immediately above and below the created sample and the sample from channel 2 immediately preceding the created sample. FIG. 24 illustrates this algorithm. VRAM memory data from FPA channel 1 is routed through the associated 4:2 multiplexer 90 into line buffer 1 during the TV vertical retrace interval. Line buffer 2 remains empty during vertical retrace.

At the beginning of TV line 2, the second 4:2 multiplexer 91 routes VRAM memory data from FPA channels 2 and 3, which is sampled in the offset format shown at the top of FIG. 12, to a three-sample median filter circuit 97. The 4:1 multiplexer 13 also routes channel 2 data directly to the final "OR" circuit 99. Since there is no prior true sample from FPA channel 2, the reformatter control circuit causes the median filter to output the value for FPA channel 3, sample 0, in FIG. 21, to fill the first TV line 2 output sample position. Boundary effects, at the first sample in even TV lines, and at the first and last TV lines, have an insignificant impact on system performance.

The reformatter control circuit passes FPA channel 2 sample 1 through "OR" circuit 99, providing TV line 2 sample 1. TV line 2 sample 2 is a median value. The reformatter control routes FPA channel 1 sample 2 from line buffer 1 through the associated "OR" circuit 96 to the first of the three median filter inputs. The second 4:2 multiplexer 91 routes FPA channel 2, sample 1 and FPA channel 3 sample 2 to the other two median filter inputs. The median filter 97 selects the median value of the three inputs and passes that value through the final "OR" circuit 99. The same "OR" circuit 99 then passes FPA channel 2 sample 3, from the 4:1 multiplexer 92 as TV line 2 sample 3. This process repeats until construction of TV line 2 is complete. The first 4:2 multiplexer 90 routes FPA channel 3 video into line buffer 2 (95) at the same time that the second 4:2 multiplexer 91 routes samples from FPA channels 2 and 3 to the median filter.

TV line 4 is formed by the same process as TV line 2, using line buffer 2 rather than line buffer 1 as one input to the median filter 97. VRAM data from FPA channels 4 and 5 is routed through the second 4:2 multiplexer 91 to the other two median filter inputs. Channel 5 data is also routed to line buffer 1. The remaining TV lines in fields B and A are formed by a similar process.

Figure 26:
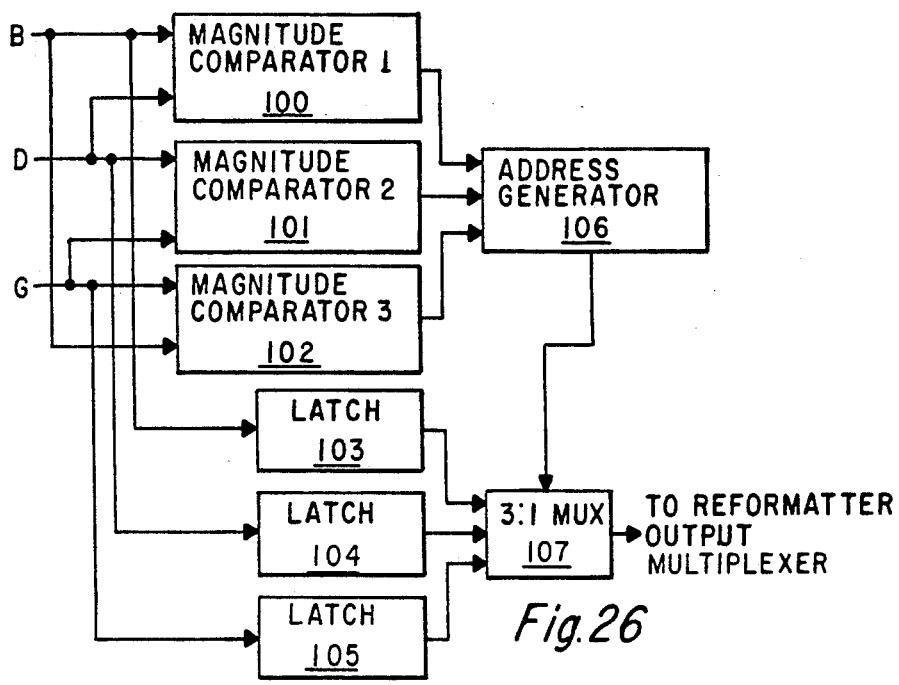
FIG. 26 is a block diagram of the median filter of FIG. 25.

FIG. 26 shows a block diagram of a three sample median filter. Three magnitude comparators 100, 101 and 102 compare the values of samples B to G, D to B and G to D. If the value of sample B (FIG. 24) is less than or equal to the value of sample G, the output of magnitude comparator 100 equals 1, otherwise it equals 0. Similarly, the output of magnitude comparator 101 equals 1 if D≦G. The output of magnitude comparator 102 equals 1 if G≦B. If two samples have exactly equal values, then either one of the two may be routed to the reformatter output multiplexer.

Table 8 lists all possible results of these three comparisons. If the results of all three comparisons are false (0), then an error has been made and the reformatter defaults to the vertical shift algorithm by selecting sample G. If all three comparisons are true (1), then all three samples have equal values. The address generator circuit 106 controls the 3:1 multiplexer circuit 107, based upon an equivalent internal look-up table. The three latches 103, 104 and 105 store the values of samples B, D and G until the median sample is selected and routed to the reformatter output multiplexer.

TABLE 8

| TRUTH TABLE FOR THREE SAMPLE MEDIAN FILTER | | | |
|---|---|---|---|
| B ≦ D | D ≦ G | G ≦ B | MEDIAN |
| 0 | 0 | 0 | ERROR G |
| 0 | 0 | 1 | D |
| 0 | 1 | 0 | B |
| 0 | 1 | 1 | G |
| 1 | 0 | 0 | G |
| 1 | 0 | 1 | B |
| 1 | 1 | 0 | D |
| 1 | 1 | 1 | EQUAL G |

The concept of selectable TDI delay embodied in FIGS. 18 and 19 can be extended to allow sampling at higher spatial sample rates for system applications requiring slow scan rates. If the total delays shown in FIG. 15 are doubled, the TDI detector can be operated at 4 samples/IFOV. This avoids the problem of detector saturation because of excessive integration time without the sacrifice of potential sensitivity. External analog or digital integration circuits could then be used to increase system sensitivity and decrease effective sample rate.

Figure 27A:
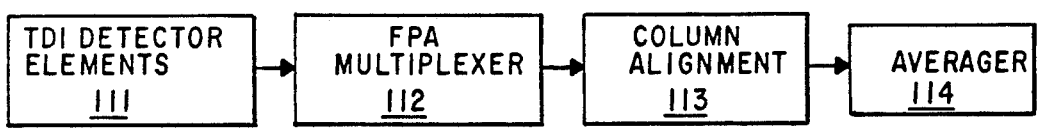
FIGS. 27A and 27B are block diagrams illustrating two channel averaging architectures.
Figure 27B:
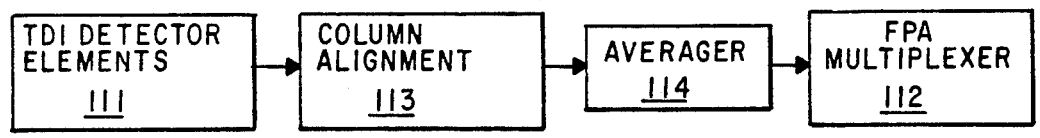

Averaging adjacent channels is another way to improve performance at 60 Hz. In this approach adjacent detector channels are averaged, regaining some of the sensitivity loss caused by the doubling scan rate. FIGS. 27A and 27B show two system architectures for the averaging approach. FPA multiplexer performance is inversely related to multiplexer rate. If channels are averaged before the multiplexer, the multiplexer rate is reduced. Therefore, averaging channels before the output multiplexer is the preferred approach.

Super-column alignment must precede channel averaging. Table 6 shows the number of sample delays required to align super-columns for various detector configurations. The significant increase in total analog delay line length required by an analog averaging approach is a source of potential performance loss. The large difference in analog delay line length between adjacent channels also increases performance risk.

Table 9 lists the detector channels sampled by each of the 16 outputs during the multiplexer state sequence. During standard 30 Hz operation, multiplexer 1 first samples channel 1, then channel 17 and finally channel 945 as it cycles through 60 states. Multiplexer 16 first samples channel 16, then channel 32 and finally channel 960. For 60 Hz operation, the multiplexer 1 first samples the average of channels 1 and 2, then the average of channels 33 and 34, etc. Only 30 multiplexer states are required to complete an FPA sample cycle.

TABLE 9
REQUIRED FPA CHANNEL AVERAGING PRIOR TO OUTPUT MULTIPLEXER FOR 60 HZ OPERATION WITH TDI DETECTOR

| MUX OUT | NORMAL MODE (30 Hz) MUX STATE | | | 60 Hz MODE, FIELD A MUX STATE | | |
|---|---|---|---|---|---|---|
| | 1 | 2 | 3...60 | 1 | 2 | 3...30 |
| 1 | 1 | 17 | 33...945 | 1 + 2 | 33 + 34 | 65 + 66...929 + 930 |
| 2 | 2 | 18 | 34...946 | 3 + 4 | 35 + 36 | 67 + 68...931 + 932 |
| 3 | 3 | 19 | 35...947 | 5 + 6 | 37 + 38 | 69 + 70...933 + 934 |
| 4 | 4 | 20 | 36...948 | 7 + 8 | 39 + 40 | 71 + 72...935 + 936 |
| 5 | 5 | 21 | 37...949 | 9 + 10 | 41 + 42 | 73 + 74...937 + 938 |
| 6 | 6 | 22 | 38...950 | 11 + 12 | 43 + 44 | 75 + 76...939 + 940 |
| 7 | 7 | 23 | 39...951 | 13 + 14 | 45 + 46 | 77 + 78...941 + 942 |
| 8 | 8 | 24 | 40...952 | 15 + 16 | 47 + 48 | 79 + 80...943 + 944 |
| 9 | 9 | 25 | 41...953 | 17 + 18 | 49 + 50 | 81 + 82...945 + 946 |
| 10 | 10 | 26 | 42...954 | 19 + 20 | 51 + 52 | 83 + 84...947 + 948 |
| 11 | 11 | 27 | 43...955 | 21 + 22 | 53 + 54 | 85 + 86...949 + 950 |
| 12 | 12 | 28 | 44...956 | 23 + 24 | 55 + 56 | 87 + 88...951 + 952 |
| 13 | 13 | 29 | 45...957 | 25 + 26 | 57 + 58 | 89 + 90...953 + 954 |
| 14 | 14 | 30 | 46...958 | 27 + 28 | 59 + 60 | 91 + 92...955 + 956 |
| 15 | 15 | 31 | 47...959 | 29 + 30 | 61 + 62 | 93 + 94...957 + 958 |
| 16 | 16 | 32 | 48...960 | 31 + 32 | 63 + 64 | 95 + 96...959 + 960 |

| MUX OUT | NORMAL MODE (30 Hz) MUX STATE | | | 60 Hz MODE, FIELD B MUX STATE | | |
|---|---|---|---|---|---|---|
| | 1 | 2 | 3...60 | 1 | 2 | 3...30 |
| 1 | SAME AS ABOVE | | | 2 + 3 | 34 + 35 | 66 + 67...930 + 931 |
| 2 | | | | 4 + 5 | 36 + 37 | 68 + 69...932 + 933 |
| 3 | | | | 6 + 7 | 38 + 39 | 70 + 71...934 + 935 |
| 4 | | | | 8 + 9 | 40 + 41 | 72 + 73...936 + 937 |
| 5 | | | | 10 + 11 | 42 + 43 | 74 + 75...938 + 939 |
| 6 | | | | 12 + 13 | 44 + 45 | 76 + 77...940 + 941 |
| 7 | | | | 14 + 15 | 46 + 47 | 78 + 79...942 + 943 |
| 8 | | | | 16 + 17 | 48 + 49 | 80 + 81...944 + 945 |
| 9 | | | | 18 + 19 | 50 + 51 | 82 + 83...946 + 947 |
| 10 | | | | 20 + 21 | 52 + 53 | 84 + 85...948 + 949 |
| 11 | | | | 22 + 23 | 54 + 55 | 86 + 87...950 + 951 |
| 12 | | | | 24 + 25 | 56 + 57 | 88 + 89...952 + 953 |
| 13 | | | | 26 + 27 | 58 + 29 | 90 + 91...954 + 955 |
| 14 | | | | 28 + 29 | 60 + 61 | 92 + 93...956 + 957 |
| 15 | | | | 30 + 31 | 62 + 63 | 94 + 95...958 + 959 |
| 16 | | | | 32 + 33 | 64 + 65 | 96 + 97...960 + NA |

Table 10 compares the relative sensitivity (Sr) of three sample FPA FLIR systems for 30 Hz standard, 60 Hz interleaved, 60 Hz channel averaged and 60 Hz standard sampling modes. Because FPA detectors have a non-zero reset time between samples, the interleaved mode provides greater sensitivity than the channel averaging approach. Channel averaging provides greater sensitivity than scanning at 60 Hz and ignoring half the detector channels. Scan efficiency is typically a function of scan angle and scan rate.

TABLE 10
SYSTEM SENSITIVITY OF INTERLEAVED AND AVERAGING APPROACHES COMPARED TO 30 Hz STANDARD SAMPLING

| $F_s$ Hz | MODE | $N_s$ | d % | $T_s$ uSec | $T_r$ uSec | $T_i$ uSec | M | E | $F_m$ MHz | $N_t$ | $S_r$ % |
|---|---|---|---|---|---|---|---|---|---|---|---|
| 30 | Std | 1280 | 75 | 19.53 | 3.0 | 16.53 | 60 | 4 | 3.28 | 4 | 100 |
| 60 | Intlv | 640 | 70 | 18.23 | 3.0 | 15.23 | 60 | 4 | 3.51 | 4 | 96 |
| 60 | Ave | 1280 | 70 | 9.11 | 3.0 | 6.11 | 30 | 4 | 3.73 | 8 | 86 |
| 60 | Std | 1280 | 70 | 9.11 | 3.0 | 6.11 | 60 | 4 | 7.02 | 4 | 61 |
| 30 | Std | 1600 | 74 | 15.42 | 3.0 | 12.42 | 60 | 4 | 4.15 | 4 | 100 |
| 60 | Intlv | 800 | 68 | 14.17 | 3.0 | 11.17 | 60 | 4 | 4.52 | 4 | 95 |
| 60 | Ave | 1600 | 68 | 7.08 | 3.0 | 4.08 | 30 | 4 | 4.80 | 8 | 81 |
| 60 | Std | 1600 | 68 | 7.08 | 3.0 | 4.08 | 60 | 4 | 9.04 | 4 | 57 |
| 30 | Std | 1920 | 73 | 12.67 | 3.0 | 9.67 | 60 | 4 | 5.05 | 4 | 100 |
| 60 | Intlv | 960 | 65 | 11.28 | 3.0 | 8.28 | 60 | 4 | 5.67 | 4 | 93 |
| 60 | Ave | 1920 | 65 | 5.64 | 3.0 | 2.64 | 30 | 4 | 6.03 | 8 | 74 |
| 60 | Std | 1920 | 65 | 5.64 | 3.0 | 2.64 | 60 | 4 | 11.34 | 4 | 52 |

Multiplexer rates for the interleaved approach are lower than for the channel averaging approach because typical FPA designs require extra clocks between multiplexer sampling cycles. The number of overhead clocks required is independent of the number of channels multiplexed. Multiplexer efficiency is directly related to the number of channels multiplexed. This imposes a further performance penalty on the channel averaging approach compared to the interleaved approach. The parameters and values in Table 10 are defined and derived from the following equations which ignore second order effects such as aliasing:

---

$T_s = d/(F_s * N_s)$
where $T_s$ = Sample time
  $d$ = Scan efficiency
  $F_s$ = Scan frequency
  $N_s$ = Number of samples per channel per scan
   = 1280 (640 interleaved) for 4:3 Aspect Ratio
   = 1600 (800 interleaved) for 5:3 Aspect Ratio
   = 1920 (960 interleaved) for 6:3 Aspect Ratio
$T_i T_s - T_r$
where $T_i$ = Integration Time
  $T_r$ = Detector reset time
   = 3.0 uSec (typical)
$F_m = (M + E)/T_s$
where $F_m$ = Minimum FPA multiplexer frequency
  $M$ = Number of FPA channels multiplexed
   = 60 for standard and interleaved sampling
   = for channel averaging before multiplexing
  $E$ = Overhead multiplexer clock cycles
   = 4 multiplex clocks (typical)
$S_r = \text{Sq Rt } [(T_{i1} * N_{t1})/(T_{i2} * N_{t2})]$
where $S_r$ = Sensitivity ratio between systems 1 and 2
  $N_t$ = Number of effective TDI elements
   = 4 for standard and interleaved approaches
   = 8 for adjacent channel average approach

---

If the FPA multiplexer is designed to output half the channels during each 60 Hz field time, the multiplexer output rate will be the same as for the averaged approach described above. However, without averaging, system sensitivity would be reduced, assuming other FPA parameters remained constant.

Figure 28:
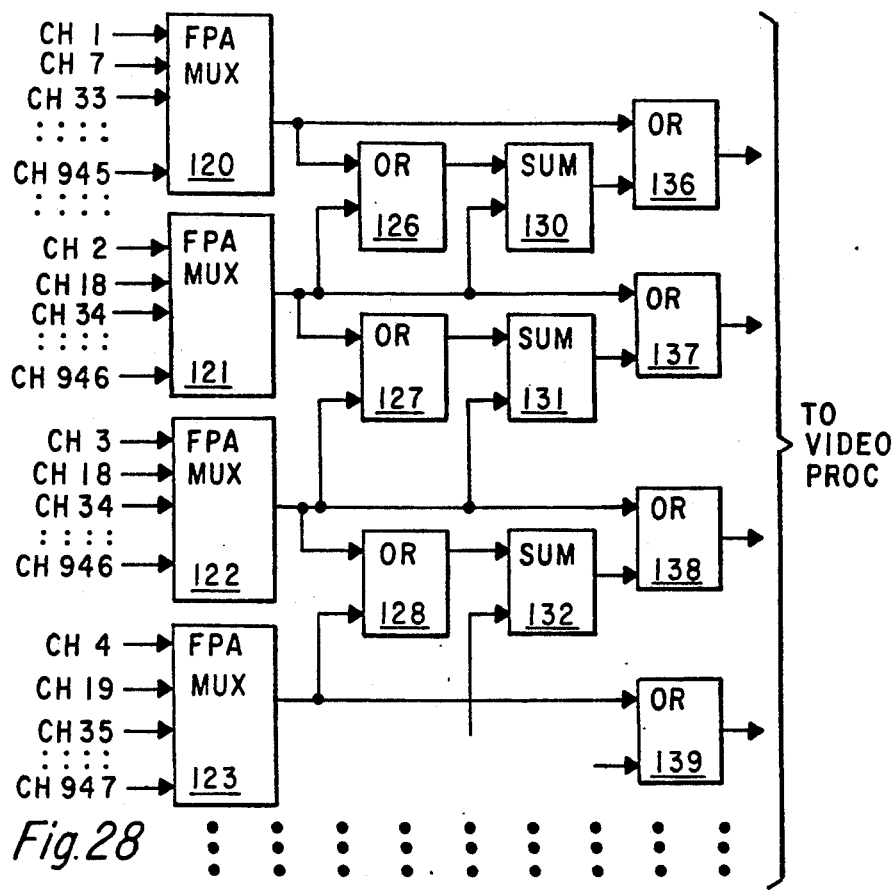
FIG. 28 is a functional block diagram for channel averaging after the FPA output multiplexer.

FIG. 28 is a functional block diagram showing channel averaging after the FPA output multiplexers 120, 121, 122 and 123. A combination of "OR" and "SUM" operations provides the results required by Table 9. This architecture requires the same high multiplexer rates as the 60 Hz standard sampling approach shown in Table 10. The functions of FIG. 28 may be performed in the analog or digital domain. Digital averaging requires twice the analog-to-digital (A/D) conversion bandwidth required by the interleaved approach. A/D converters of the type required for these example systems are very expensive. This is an additional reason to perform channel averaging before the FPA multiplexer.

Figure 29:
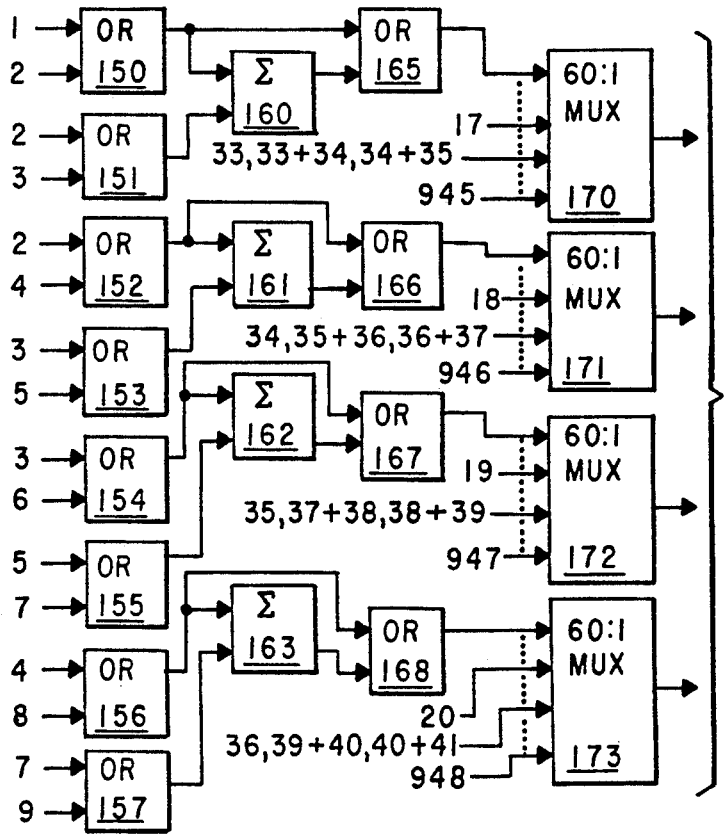
FIG. 29 is a functional block diagram for channel averaging before the FPA output multiplexer.

FIG. 29 is a functional block diagram showing channel averaging before the FPA output multiplexers. Only the first four of 16 identical circuits are shown. Thirty of the 60 inputs to each multiplexer are preceded by three "OR" circuits 150, 151 and 165 and one "SUM" circuit 160. The remaining inputs, i.e. those corresponding to channels 17, 49 . . . 945) for the first multiplexer 170, do not require this structure. For 30 Hz standard sampling, "OR" circuits 150 and 165 pass channel 1 directly to FPA output multiplexer 170. Channel 17 is passed directly to the multiplexer. Channel 33 is passed through two "OR" circuits identical to those for channel 1.

For 60 Hz, field A, channel averaging "OR" circuit 150 routes channel 1 to "SUM" circuit 160. "OR" circuit 151 routes channel 2 to the same "SUM" circuit 160. "OR" circuit 165 routes the result of "SUM" circuit 160 to FPA multiplexer 170. FPA multiplexer addressing is modified so that states corresponding to inputs for channels 17, 49 . . . 949 are skipped. During field B, "OR" circuit 150 routes channel 2 to "SUM" circuit 160. "OR" circuit 151 routes channel 3 to "SUM" circuit 160.

Figure 30:
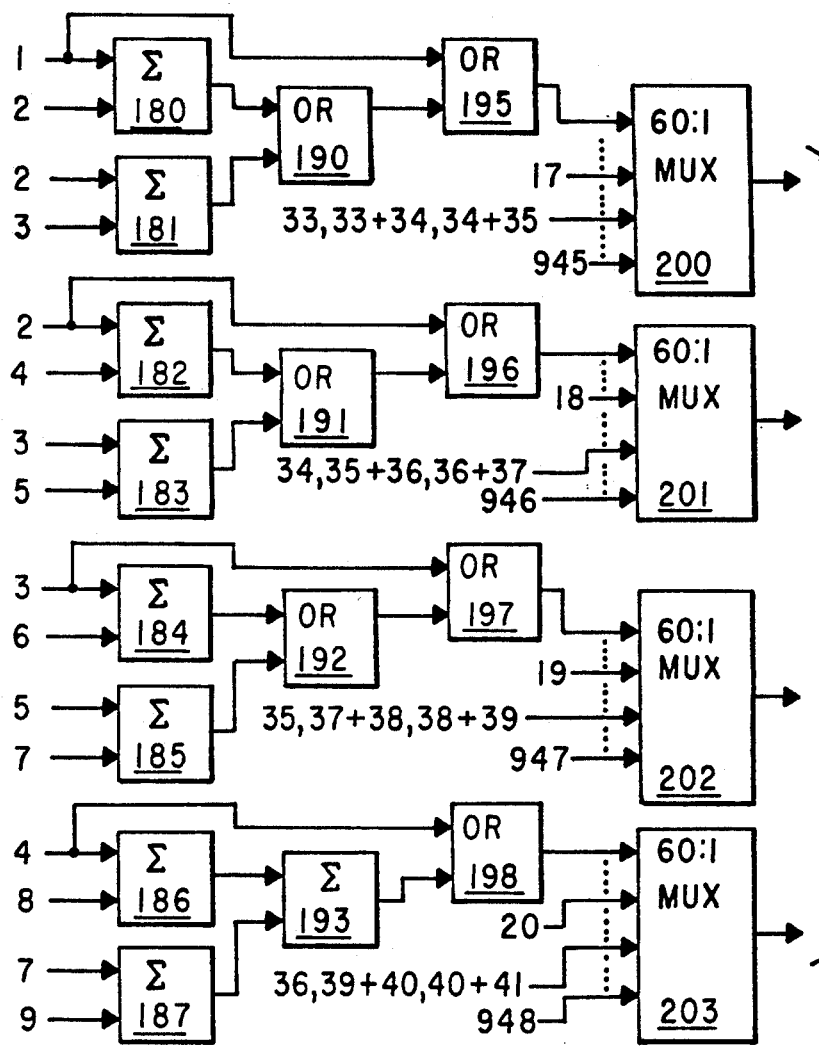
FIG. 30 is an alternate block diagram implementation of channel averaging before the FPA output multiplexer.

FIG. 30 shows an approach to channel averaging which is equivalent to that of FIG. 29.

Interleaved sampling is possible for two-supercolumn TDI focal plane arrays if the distance between supercolumns and TDI elements is as shown in FIG. 31. If the positions of supercolumns 2 and 3 in a four supercolumn structure are reversed, as shown in FIG. 32, only the distance between supercolumns 3 and 2 is increased by 0.5 IFOVs to achieve interleaved sampling. The distance between supercolumns 1 and 3 and between supercolumns 2 and 4 is an integer number of IFOVs.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A forward looking infrared system, comprising:
   (a) a scanner for scanning a scene in alternate odd and even channels at a predetermined scanning rate to provide a plurality of equally time spaced samples in each said channel;
   (b) an offsetting circuit offsetting said samples in said even channels relative to said odd channels to be time spaced intermediate adjacent samples of said odd channels;
   (c) a storage circuit storing a plurality of odd TV lines, each of said odd lines composed of the samples from a different one of said odd channels with individual samples from the following even channel disposed between an adjacent pair of samples of said odd channel and a plurality of even TV lines, each of said even lines composed of the samples from a different one of said even channels with individual samples from the following odd channel disposed between an adjacent pair of samples of said even channel; and
   (d) video generating circuitry for generating video signals from said odd TV lines and said even TV lines in interlaced manner at a multiple of said predetermined rate;
   (e) wherein said scanner includes a plurality of detector elements arranged in columns and channels, and plural summing devices, each summing device associated with a different predetermined plurality of said detector elements in one of said channels to provide said sample for the associated channel.

2. The system of claim 1 further including the step of forming a display in response to said video signals.

3. The system of claim 2 wherein said display is a television system.

4. The system of claim 1 wherein said multiple is two.

5. The system of claim 4 further including the step of forming a display in response to said video signals.

6. The system of claim 5 wherein said display is a television system.

7. A method of providing a sampling pattern for a focal plane array forward looking infrared system which comprises the machine executed steps of:
   (a) scanning a scene in alternate odd and even channels at a predetermined scanning rate to provide a plurality of equally time spaced samples in each said channel;
   (b) offsetting said samples in said even channels relative to said odd channels to be time spaced intermediate adjacent samples of said odd channels;
   (c) forming a plurality of odd TV lines, each of said odd lines composed of the samples from a different one of said odd channels and the interstices between said samples in each of said odd lines being composed of a sample which is a function of the samples abutting each of said interstices in said odd lines; and
   (d) forming a plurality of even TV lines, each of said even lines composed of the samples from a different one of said even channels and the interstices between said samples in each of said even lines being composed of a sample which is a function of the samples abutting each of said interstices in said even lines.

8. A detecting method for focal plane array forward looking infrared system, comprising the steps of:
   (a) scanning a scene in alternate odd and even channels at a predetermined scanning rate to provide a plurality of equally time spaced samples in each said channel;
   (b) offsetting said samples in said even channels relative to said odd channels to be time spaced intermediate adjacent samples of said odd channels;
   (c) forming a plurality of odd TV lines, each of said odd lines composed of the samples from a different one of said odd channels and the interstices between said samples in each of said odd lines being composed of a sample which is a function of the samples abutting each of said interstices in said odd lines;
   (d) forming a plurality of even TV lines, each of said even lines composed of the samples from a different one of said even channels and the interstices between said samples in each of said even lines being composed of a sample which is a function of the samples abutting each of said interstices in said even lines; and
   (e) generating video signals from said odd TV lines and said even TV lines in interlaced manner at a multiple of said predetermined rate.

9. A forward looking infrared system, comprising:
   (a) a scanner for scanning a scene in alternate odd and even channels at a predetermined scanning rate to provide a plurality of equally time spaced samples in each said channel;
   (b) an offsetting circuit offsetting said samples in said even channels relative to said odd channels to be time spaced intermediate adjacent samples of said odd channels;
   (c) a storage circuit storing a plurality of odd TV lines, each of said odd lines composed of the samples from a different one of said odd channels and the interstices between said samples in each of said odd lines being composed of a sample which is a function of the samples abutting each of said interstices in said odd lines and a plurality of even TV lines, each of said even lines composed of the samples from a different one of said even channels and the interstices between said samples in each of said even lines being composed of a sample which is a function of the samples abutting each of said interstices in said even lines; and
   (d) video generating circuitry for generating video signals from said odd TV lines and said even TV lines in interlaced manner at a multiple of said predetermined rate.

10. The system of claim 9 wherein said scanner includes a plurality of detector elements arranged in columns and channels, and plural summing devices, each summing device associated with a different predetermined plurality of said detector elements in one of said channels to provide said sample for the associated channel.

11. The system of claim 10 wherein the detector elements in adjacent columns in succeeding ones of said channels are spaced a greater distance than the detector element spacing in each of said channels.

12. The system of claim 9 further including the step of forming a display in response to said video signals.

13. The system of claim 12 wherein said display is a television system.

14. The system of claim 12 wherein said scanner includes a plurality of detector elements arranged in columns and channels, and plural summing devices, each summing device associated with a different predetermined plurality of said detector elements in one of said channels to provide said sample for the associated channel.

15. The system of claim 9 wherein said multiple is two.

16. The system of claim 15 wherein said scanner includes a plurality of detector elements arranged in columns and channels, and plural summing devices, each summing device associated with a different predetermined plurality of said detector elements in one of said channels to provide said sample for the associated channel.

17. The system of claim 15 further including the step of forming a display in response to said video signals.

18. The system of claim 17 wherein said display is a television system.

19. The system of claim 17 wherein said scanner includes a plurality of detector elements arranged in columns and channels, and plural summing devices, each summing device associated with a different predetermined plurality of said detector elements in one of said channels to provide said sample for the associated channel.

20. The system of claim 19 wherein the detector elements in adjacent columns in succeeding ones of said channels are spaced a greater distance than the detector element spacing in each of said channels.

* * * * *